US012657061B2

(12) United States Patent
Roy et al.

(10) Patent No.: US 12,657,061 B2
(45) Date of Patent: Jun. 16, 2026

(54) METHOD AND SYSTEM FOR SECURE SCHEDULING OF WORKFLOWS AND VIRTUAL MACHINE UTILIZATION IN CLOUD

(71) Applicant: Tata Consultancy Services Limited, Mumbai (IN)

(72) Inventors: Shubhro Shovan Roy, Kolkata (IN); Arun Ramamurthy, Pune (IN); Mangesh Sharad Gharote, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 710 days.

(21) Appl. No.: 18/058,633

(22) Filed: Nov. 23, 2022

(65) Prior Publication Data

US 2023/0214268 A1    Jul. 6, 2023

(30) Foreign Application Priority Data

Jan. 5, 2022   (IN) ............................ 202221000646

(51) Int. Cl.
*G06F 9/50*        (2006.01)
*G06F 9/48*        (2006.01)
*G06F 11/34*       (2006.01)

(52) U.S. Cl.
CPC .......... *G06F 9/5038* (2013.01); *G06F 9/4881* (2013.01); *G06F 9/4887* (2013.01);
(Continued)

(58) Field of Classification Search
None
See application file for complete search history.

(56) References Cited

U.S. PATENT DOCUMENTS 11,055,135 B2    7/2021   Popovic et al.
2013/0144678 A1*  6/2013   Ramachandran ...... G06Q 10/06
                                                705/7.26
(Continued)

OTHER PUBLICATIONS

Zhongjin Li, Jidong Ge, Hongji Yang, Liguo Huang, Haiyang Hu, Hao Hu, and Bin Luo. 2016. A security and cost aware scheduling algorithm for heterogeneous tasks of scientific workflow in clouds. Future Gener. Comput. Syst. 65, C (Dec. 2016), 140-152. https://doi.org/10.1016/j.future.2015.12.014 (Year: 2016).*
(Continued)

*Primary Examiner* — Abu Zar Ghaffari
(74) *Attorney, Agent, or Firm* — Finnegan, Henderson, Farabow, Garrett & Dunner, LLP

(57)        ABSTRACT

Scheduling of tasks in workflow comprises of heterogeneous and interdependent computational tasks. The method receives a set of workflows comprising of one or more heterogeneous tasks. Further, a set of parameters are extracted from each heterogeneous task to select a set of optimal virtual machines (VM) type combination parameters and a set of security level combination parameters. The method selects the optimized combination of VM types, security service levels and task order. Further, a workflow schedule is generated for the tasks of the selected VM type combinations. The method further performs optimal selection of VM types and security services, with efficient schedule generation, and effectively reuses VM with reduced overall cost without delay in make span. Additionally, the method enhances security model with accurate risk estimation.

14 Claims, 13 Drawing Sheets

(52) U.S. Cl.
CPC .......... *G06F 9/5005* (2013.01); *G06F 9/5077* (2013.01); *G06F 11/3495* (2013.01); *G06F 9/5011* (2013.01); *G06F 9/5027* (2013.01); *G06F 2209/501* (2013.01)

(56) References Cited

U.S. PATENT DOCUMENTS

| | | | | |
|---|---|---|---|---|
| 2016/0112362 A1* | 4/2016 | Perazzo | ......... | G06Q 10/063114 |
| | | | | 455/466 |
| 2018/0136976 A1* | 5/2018 | Ammari | .................. | G06F 9/505 |
| 2018/0349183 A1* | 12/2018 | Popovic | ............... | G06F 9/4881 |
| 2020/0026562 A1* | 1/2020 | Bahramshahry | .... | H04L 41/5009 |
| 2020/0186445 A1* | 6/2020 | Govindaraju | .......... | H04L 67/34 |
| 2021/0026690 A1* | 1/2021 | Al-Turki | ............... | G06F 9/4893 |
| 2021/0092145 A1* | 3/2021 | Jaysingh | ............. | G06F 9/45558 |
| 2021/0373946 A1* | 12/2021 | Liang | ................... | G06Q 20/123 |
| 2022/0030009 A1* | 1/2022 | Hasan | ................ | H04L 63/1491 |
| 2022/0147388 A1* | 5/2022 | Mundra | .................. | G06F 21/53 |
| 2022/0197773 A1* | 6/2022 | Butler | ................ | H04N 21/2223 |
| 2023/0029609 A1* | 2/2023 | Chiang | ................ | G06F 9/5066 |

OTHER PUBLICATIONS

Konjaang, J. Kok et al., "Multi-objective workflow optimization strategy (MOWOS) for cloud computing", Journal of Cloud Computing: Advances, Systems, Date: 2021, Publisher: Springer, //link.springer.com/content/pdf/10.1186/s13677-020-00219-1_pdf.

Hammouti, Sarra et al., "Workflow Security Scheduling Strategy in Cloud Computing", Modelling and Implementation of Complex Systems, Date: Jun. 2020, pp. 48-61, Publisher: Springer, //ndpublisher.in/countpdfdownload.php?id=4737&pdf=IJAEBv14n2s.pdf.

Manasrah, Ahmad M. et al., "Workflow Scheduling Using Hybrid GA-PSO Algorithm in Cloud Computing", Wireless Communications and Mobile Computing, Date: 2017, Publisher: Hindawi, //downloads.hindawi.com/journals/wcmc/2018/1934784.pdf.

* cited by examiner

Figure 2B:
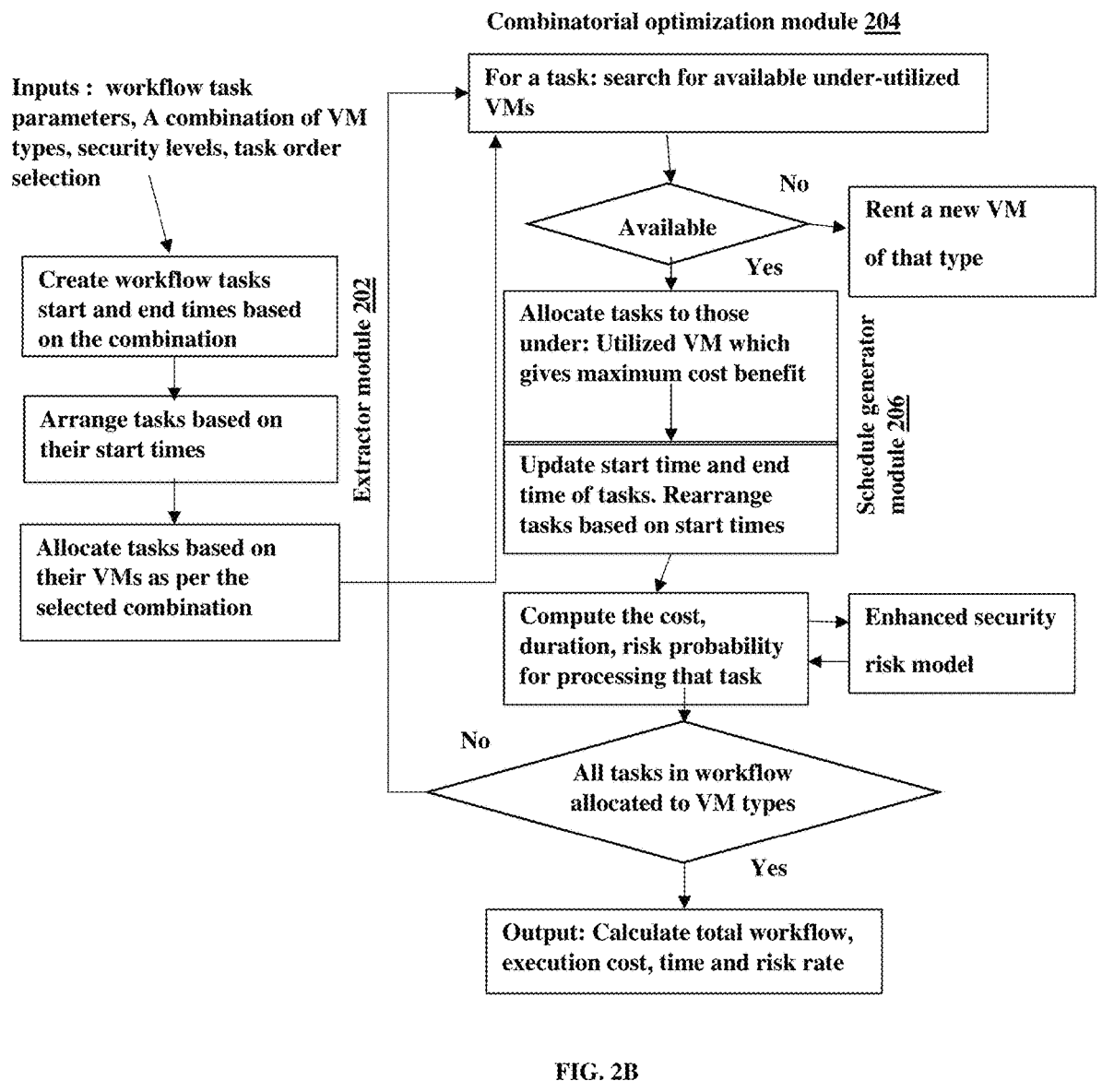

Combinatorial optimization module 204

Inputs : workflow task parameters, A combination of VM types, security levels, task order selection For a task: search for available under-utilized VMs Available → No → Rent a new VM of that type Yes Create workflow tasks start and end times based on the combination Extractor module 202

Allocate tasks to those under: Utilized VM which gives maximum cost benefit

Arrange tasks based on their start times

Update start time and end time of tasks. Rearrange tasks based on start times

Schedule generator module 206

Allocate tasks based on their VMs as per the selected combination

Compute the cost, duration, risk probability for processing that task → Enhanced security risk model No All tasks in workflow allocated to VM types Yes Output: Calculate total workflow, execution cost, time and risk rate

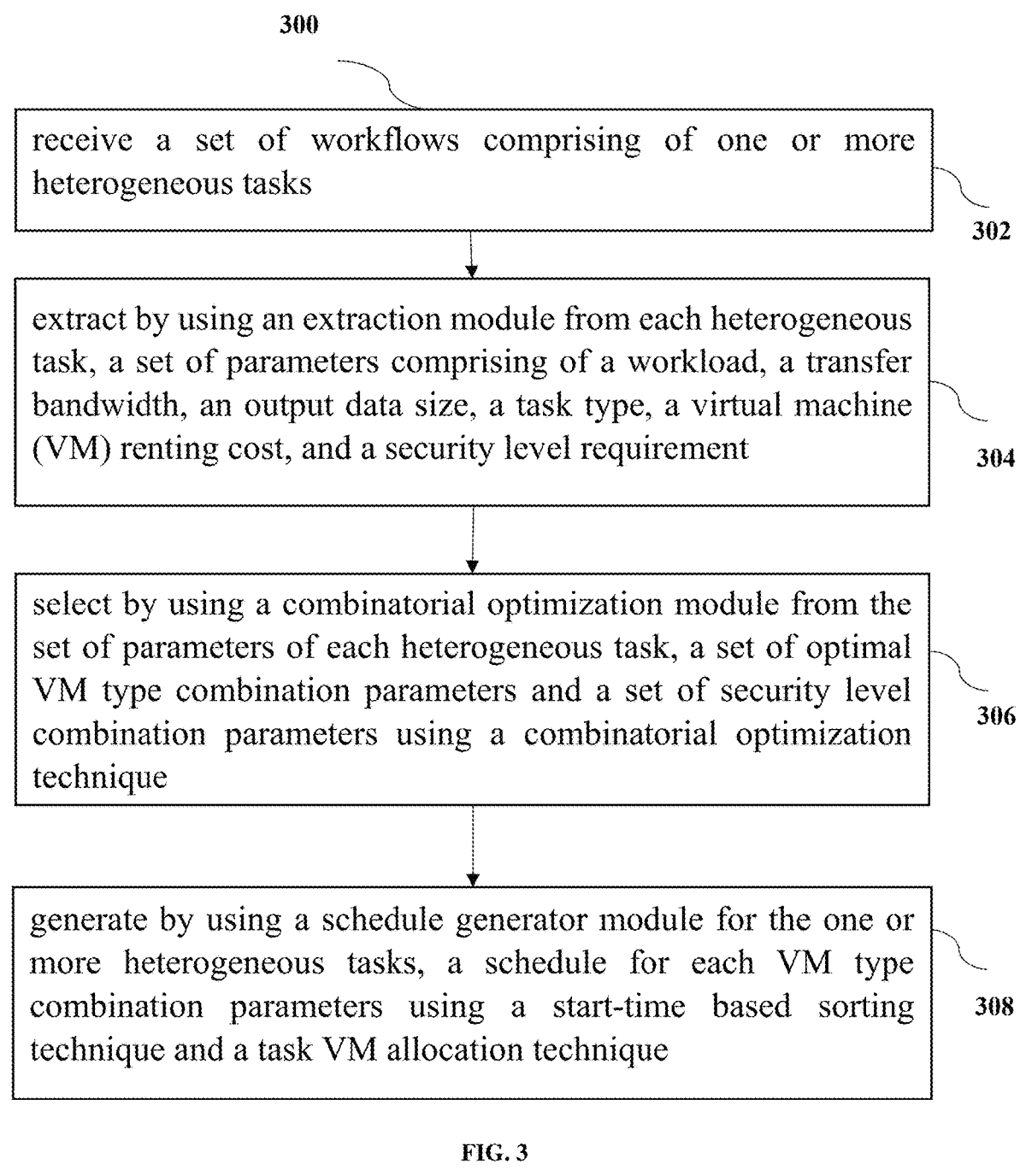

| receive a set of workflows comprising of one or more heterogeneous tasks | 302 |

| extract by using an extraction module from each heterogeneous task, a set of parameters comprising of a workload, a transfer bandwidth, an output data size, a task type, a virtual machine (VM) renting cost, and a security level requirement | 304 |

| select by using a combinatorial optimization module from the set of parameters of each heterogeneous task, a set of optimal VM type combination parameters and a set of security level combination parameters using a combinatorial optimization technique | 306 |

| generate by using a schedule generator module for the one or more heterogeneous tasks, a schedule for each VM type combination parameters using a start-time based sorting technique and a task VM allocation technique | 308 |

FIG. 3

PT = 90 mins
ST = 70 mins
ET = 160 mins
IT = 30 mins
Compute intensive

WSG
PT = 125 mins
ST = 160 mins
ET = 285 mins
IT = 55 mins

OptReUse
PT = 125 mins
ST = 160 mins
ET = 285 mins
IT = 15 mins

Data intensive

Data intensive

PT = 70 mins
ST = 0 mins
ET = 70 mins
IT = 50 mins

Data intensive

PT = 80 mins
ST = 70 mins
ET = 150 mins
IT = 30 mins

Memory intensive

PT = 200 mins
ST = 285 mins
ET = 485 mins
IT = 40 mins

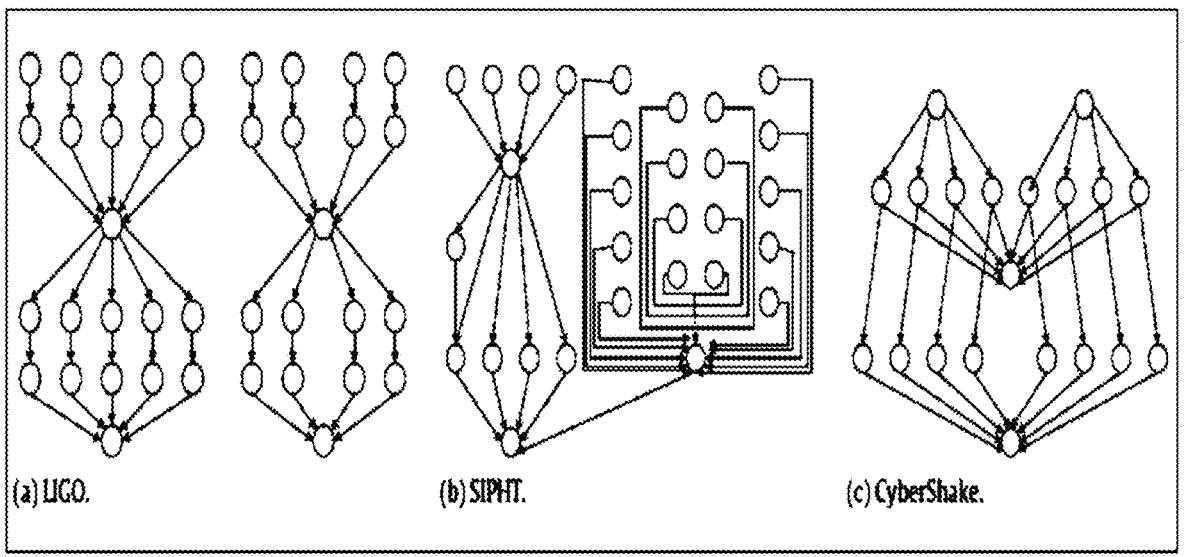
FIG. 6B (Prior Art: Li)

METHOD AND SYSTEM FOR SECURE SCHEDULING OF WORKFLOWS AND VIRTUAL MACHINE UTILIZATION IN CLOUD

PRIORITY CLAIM

This U.S. patent application claims priority under 35 U.S.C. § 119 to: Indian Patent Application number 202221000646, filed on Jan. 5, 2022. The entire contents of the aforementioned application are incorporated herein by reference.

TECHNICAL FIELD

The disclosure herein generally relates to workflow scheduling, and, more particularly, to method and system for secure scheduling of workflows and virtual machine utilization in cloud.

BACKGROUND

In recent trends, cloud computing environment with a set of distributed computing resources are very promising for execution of large-scale applications as they provide ready to go infrastructure for any heterogeneous task. One of these applications is scientific workflow applications in which a large set of interrelated or heterogeneous tasks is executed for certain purposes. Here, scientific workflow scheduling is one of the main challenges, which aims at optimal assignment of tasks to computational resources and generating a schedule, such that execution cost is minimal. However, complex tasks, which contain a large number of interconnected applications, which are usually called workflows, require efficient tasks scheduling in order to satisfy user defined quality of service such as cost or execution time. Workflow scheduling involves processing the tasks on selected computational resources considering the dependency order. Since Cloud Service Providers (CSPs) offer highly scalable computational resources, such as Virtual Machines (VM) at pay-per-use model, cloud has emerged as a cost- and time-effective platform for solving scientific workflow problems.

In one existing approach of scheduling workflows, tasks have been partitioned into multiple paths from start tasks to exit tasks. Using the critical path, the execution time for the workflow is obtained. The tasks on the critical path were scheduled on a combination of high and low-capacity virtual machines (VM) and remaining tasks were scheduled on low capacity VM to achieve lower cost. In another existing approach, tasks were completed with finish time algorithm along with task duplication for workflow scheduling. In another existing approach workflow schedule generation (WSG) re-utilizes virtual machines with cost reduction lacking in estimating security risk. However, these approaches lack in providing optimal re-utilization of virtual machine and security risk estimation. However, complete search space is not explored to identify available virtual machines.

SUMMARY

Embodiments of the present disclosure present technological improvements as solutions to one or more of the above-mentioned technical problems recognized by the inventors in conventional systems. For example, in one embodiment, a method and system for secure scheduling of workflows and virtual machine utilization in cloud is provided. The system 100 includes receiving a set of workflows comprising of one or more heterogeneous tasks. Further, a set of parameters are extracted from each heterogeneous task comprising of a workload, a transfer bandwidth, an output data size, a task type, a virtual machine (VM) renting cost, and a security level requirement. The set of parameters of each heterogeneous task are selected from a set of optimal VM type combination parameters and a set of security level combination parameters using a combinatorial optimization technique. Further, a schedule for each VM type combination parameters generated for the one or more heterogeneous tasks by computing a set of timing parameters from at least one of (i) the set of optimal VM type combination parameters, and the set of parameters, and (ii) sorting each heterogeneous task based on a start order of initial start time and capturing information of currently utilized VM for cost optimization using a start time based sorting technique. Then, each heterogeneous task with the set of optimal VM type combination allocating using a task VM allocation technique by computing a time execution cost (TEC) and a total execution time (TET) based on the set of timing parameters.

The start time based sorting technique performs the steps of obtaining the set of VM type combination and the set of parameters and initialize the index array for storing the start order of each heterogenous task. Each heterogeneous task is computed for (i) a total transfer time (TT), (ii) an execution time (EXT), and (iii) a security overhead (SC). Further, the start time array (ST[•]) of each heterogeneous task is updated with maximum end time array (ET[j]) of its predecessor task and store in the start time array (ST[•]). The end time array (ET[•]) is computed which is the sum of start time array (ST[•]) and a total processing time (PT), wherein the total processing time is the sum of the security overhead (SC), execution time (EXT), and the total transfer time (TT). Further, a start time reserve array (ST$_r$) with the start time array (ST[•]) value and an end time reserve array (ET$_r$) with the end time array ET[•]) are updated to sort the start time (ST), the end time (ET), and the index array (ID) based on sorted order of start time.

The task VM allocation technique performs the steps of initializing zeros for the total execution time and an idle time array (IT) for storing information. Then, unutilized optimal VM type are searched for processed for prior heterogeneous task and is currently available to process next heterogeneous task with low VM renting cost and idle time, (i) if the heterogeneous task reuses the VM type used by corresponding predecessor task VM renting cost reduction is available with idle time and data transfer cost is excluded, and (ii) if the heterogeneous task reuses the VM type used by corresponding non-predecessor task VM renting cost reduction is for only available idle time. Further, a new VM type for each heterogeneous task is rented when reusable VM type is unidentified. Further, a new idle time is computed for the current heterogeneous task which reuses the VM type used by the prior heterogeneous task and update idle time array (IT[j]) for the current heterogeneous task with an identifier and the new idle time array with current heterogeneous task (IT[i]). For each heterogeneous task computes the total execution cost, the total execution time, a task risk probability, a risk probability, and a total risk rate. Further, the total execution cost for the workflow increments the current heterogeneous task by updating the data transfers. Further, the end time sorts the index array and the start time and compute the total execution cost for the one or more heterogeneous task based on maximum end time. The end time computes based on summing the start time with the difference value of the end time array and the start time array.

In another aspect, a method for secure scheduling of workflows and virtual machine optimization in cloud is provided. The method includes receiving a set of workflows comprising of one or more heterogeneous tasks. Further, a set of parameters are extracted from each heterogeneous task comprising of a workload, a transfer bandwidth, an output data size, a task type, a virtual machine (VM) renting cost, and a security level requirement. The set of parameters of each heterogeneous task are selected a set of optimal VM type combination parameters and a set of security level combination parameters using a combinatorial optimization technique. Further, a schedule for each VM type combination parameters generate for the one or more heterogeneous tasks by computing a set of timing parameters from at least one of (i) the set of optimal VM type combination parameters, and the set of parameters, and (ii) sorting each heterogeneous task based on a start order of initial start time and capturing information of currently utilized VM for cost optimization using a start time based sorting technique. Then, each heterogeneous task with the set of optimal VM type combination allocating using a task VM allocation technique by computing a time execution cost (TEC) and a total execution time (TET) based on the set of timing parameters.

The start time based sorting technique performs the steps of obtaining the set of VM type combination and the set of parameters and initialize the index array for storing the start order of each heterogenous task. Each heterogeneous task is computed for (i) a total transfer time (TT), (ii) an execution time (EXT), and (iii) a security overhead (SC). Further, the start time array (ST[•]) of each heterogeneous task is updated with maximum end time array (ET[j]) of its predecessor task and store in the start time array (ST[•]). The end time array (ET[•]) is computed which is the sum of start time array (ST[•]) and a total processing time (PT), wherein the total processing time is the sum of the security overhead (SC), execution time (EXT), and the total transfer time (TT). Further, a start time reserve array (STT) with the start time array (ST[•]) value and an end time reserve array (ET$_r$) with the end time array ET[•]) are updated to sort the start time (ST), the end time (ET), and the index array (ID) based on sorted order of start time.

The task VM allocation technique performs the steps of initializing zeros for the total execution time and an idle time array (IT) for storing information. Then, unutilized optimal VM type are searched for processed for prior heterogeneous task and is currently available to process next heterogeneous task with low VM renting cost and idle time, (i) if the heterogeneous task reuses the VM type used by corresponding predecessor task VM renting cost reduction is available with idle time and data transfer cost is excluded, and (ii) if the heterogeneous task reuses the VM type used by corresponding non-predecessor task VM renting cost reduction is for only available idle time. Further, a new VM type for each heterogeneous task is rented when reusable VM type is unidentified. Further, a new idle time is computed for the current heterogeneous task which reuses the VM type used by the prior heterogeneous task and update idle time array (IT[j]) for the current heterogeneous task with an identifier and the new idle time array with current heterogeneous task (IT[i]). For each heterogeneous task computes the total execution cost, the total execution time, a task risk probability, a risk probability, and a total risk rate. Further, the total execution cost for the workflow increments the current heterogeneous task by updating the data transfers. Further, the end time sorts the index array and the start time and compute the total execution cost for the one or more heterogeneous task based on maximum end time. The end time computes based on summing the start time with the difference value of the end time array and the start time array.

In yet another aspect, a non-transitory computer readable medium provides one or more non-transitory machine-readable information storage mediums comprising one or more instructions, which when executed by one or more hardware processors perform actions includes an I/O interface and a memory coupled to the processor is capable of executing programmed instructions stored in the processor in the memory to receives a set of workflows comprising of one or more heterogeneous tasks. Further, a set of parameters are extracted from each heterogeneous task comprising of a workload, a transfer bandwidth, an output data size, a task type, a virtual machine (VM) renting cost, and a security level requirement. The set of parameters of each heterogeneous task are selected a set of optimal VM type combination parameters and a set of security level combination parameters using a combinatorial optimization technique. Further, a schedule for each VM type combination parameters generate for the one or more heterogeneous tasks by computing a set of timing parameters from at least one of (i) the set of optimal VM type combination parameters, and the set of parameters, and (ii) sorting each heterogeneous task based on a start order of initial start time and capturing information of currently utilized VM for cost optimization using a start time based sorting technique. Then, each heterogeneous task with the set of optimal VM type combination allocating using a task VM allocation technique by computing a time execution cost (TEC) and a total execution time (TET) based on the set of timing parameters.

The start time based sorting technique performs the steps of obtaining the set of VM type combination and the set of parameters and initialize the index array for storing the start order of each heterogenous task. Each heterogeneous task is computed for (i) a total transfer time (TT), (ii) an execution time (EXT), and (iii) a security overhead (SC). Further, the start time array (ST[•]) of each heterogeneous task is updated with maximum end time array (ET[j]) of its predecessor task and store in the start time array (ST[•]). The end time array (ET[•]) is computed which is the sum of start time array (ST[•]) and a total processing time (PT), wherein the total processing time is the sum of the security overhead (SC), execution time (EXT), and the total transfer time (TT). Further, a start time reserve array (ST$_r$) with the start time array (ST[•]) value and an end time reserve array (ET$_r$) with the end time array ET[•]) are updated to sort the start time (ST), the end time (ET), and the index array (ID) based on sorted order of start time. If there are more tasks with same start time, then ordering of such heterogeneous tasks are selected. The second set of chromosome in the evolutionary algorithm represents this selection.

The task VM allocation technique performs the steps initially by initializing zeros for the total execution time and an idle time array (IT) for storing information. Then, unutilized optimal VM type are searched for processing previous heterogeneous task and currently available consecutive heterogeneous task with low VM renting cost and idle time based on the said criteria such as, if the heterogeneous task reuses the VM type used by corresponding predecessor task VM renting cost reduction is available with idle time and data transfer cost is excluded, and if the heterogeneous task reuses the VM type used by corresponding non-predecessor task VM renting cost reduction is for only available idle time. Further, a new VM type for each heterogeneous task is rented when reusable VM type is unidentified. Then, a new idle time is computed for the current heterogeneous task which reuses the VM type used by previous heterogeneous task, and idle time array (IT[j]) is updated for the current heterogeneous task with an identifier and the new idle time array with current heterogeneous task (IT[i]). Here, for each heterogeneous task the total execution cost, the total execution time, a task risk probability, a risk probability, and a total risk rate are computed. Total execution cost for the workflow is incremented for the current heterogeneous task by updating data transfer. Further, the end time, the index array and the start time are sorted, and total execution cost is computed for each heterogeneous task based on maximum end time. Then, the end time is computed based on summing the start time with the difference value of the end time array and the start time array.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2A and FIG. 2B illustrates a functional block diagram of the workflow scheduling system of FIG. 1, in accordance with some embodiments of the present disclosure.

FIG. 3 illustrates a flow diagram of the method for scheduling of one or more heterogeneous task by selecting optimal combination of virtual machine parameters using the system of FIG. 1, in accordance with some embodiments of the present disclosure.

FIG. 6B illustrates a structure comparison on standard benchmark workflows of a laser interferometer gravitational wave observatory (LIGO), a sRNA identification protocol using high throughput technology (SIPHT) and a Cyber-Shake using the system of FIG. 1, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for secure scheduling of workflows and virtual machine optimization in cloud. The system herein may be alternatively referred as workflow scheduling system 100. The method provides an efficient workflow schedule mechanism for one or more heterogeneous tasks with varying security service requirements and virtual machine (VM) type by extracting a set of parameters. Further, the method of the present disclosure enables to reuse VM among different tasks thereby avoiding delay and improving total cost. The system 100 schedules the one or more heterogeneous tasks by first sorting them based on starting times and then allocating them to the most profitable VMs with transfer time adjustments. Also, if multiple workflows are considered for simultaneous scheduling, the method treats multiple workflows as several unconnected components of a single direct acyclic graph (DAG). Thus, finds VM reuse between tasks of different workflows executing simultaneously and which lacks in existing workflow scheduling techniques where reuse is based upon graph traversal. The method is further enhanced with security model that keeps the risk rate of the workflow below a permissible limit while accurately estimating the risk providing optimal combination of security levels for tasks without violation of risk rate constraint. Further, the security model can be enhanced by considering task replication-based security. The disclosed workflow scheduling system 100 determines optimal VM type for each workflow tasks, and then selects appropriate security service level for each VM for scheduling each task. This enhances security model with accurate estimation of risks. The system 100 is further explained with the method as described in conjunction with FIG. 1 to FIG. 8 below.

Figure 1:
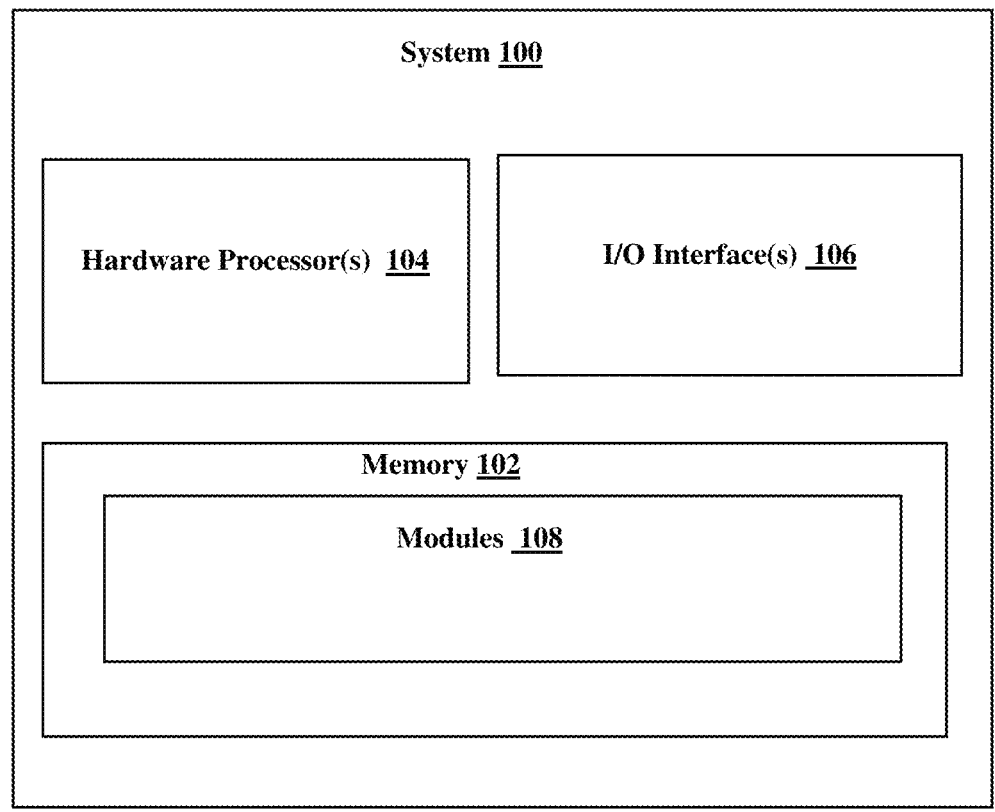
FIG. 1 illustrates an exemplary system (alternatively referred as workflow scheduling system 100) for secure scheduling of workflows and virtual machine utilization in cloud, in accordance with some embodiments of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

FIG. 1 illustrates an exemplary system (alternatively referred as workflow scheduling system 100) for secure scheduling of workflows and virtual machine utilization in cloud, in accordance with some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2A:
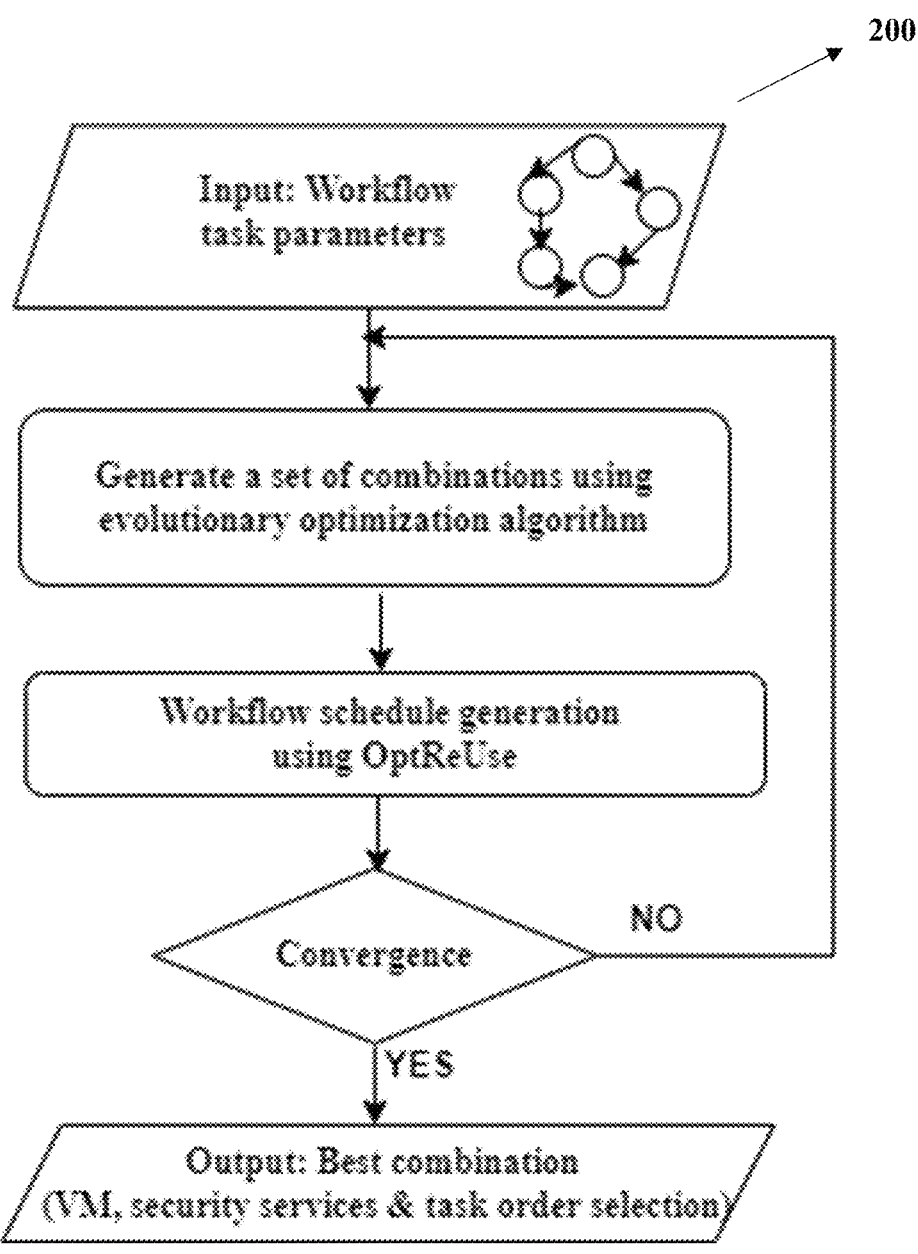

FIG. 2A and FIG. 2B illustrates a functional block diagram of the workflow scheduling system of FIG. 1, in accordance with some embodiments of the present disclosure. FIG. 2 shows an extractor module 202, a combinatorial optimization module 204, and a schedule generator module 206. The workflow scheduling system receives a set of workflows comprising of one or more heterogeneous tasks from at least one user. The extractor module 202 processes extracts a set of parameters from each heterogeneous task. The combinatorial optimization module 204 selects a set of optimal VM type combination parameters and a set of security level combination from the set of parameters of each heterogeneous task. The schedule generator module 206 generates a schedule for each VM type combination parameters using a start time based sorting technique and a task VM allocation technique. The present disclosure is further explained considering an example, where the system 100 reutilizes unutilized virtual machine and optimizes for one or more heterogeneous tasks for the received input with various embodiments. Functions of the components of system 100, for time series prediction of target variable, are explained in conjunction with FIG. 3 through FIG. 8 providing flow diagram, architectural overviews, and performance analysis of the system 100.

FIG. 3 illustrates a flow diagram of the method for scheduling of one or more heterogeneous task by selecting optimal combination of virtual machine parameters using the system of FIG. 1, in accordance with some embodiments of the present disclosure. In one embodiment, the workflow scheduling system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the workflow scheduling system 100 as depicted in FIG. 2 through FIG. 8. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300 one or more hardware processors 104 receive from a user, a set of workflows comprising of one or more heterogeneous tasks. The present disclosure is further explained considering an example (FIG. 4A) as depicted, where the system 100 receives the set of workflows and each workflow is represented as a directed acyclic graph DAG (T, E) and where T represents one or more heterogeneous tasks $\{t_0, t_1, t_2, \ldots t_n\}$ modeled as vertices in the DAG and E represents a set of edges $\{e_0, e_1, e_2, \ldots ek\}$ modeled as dependencies between the tasks. Here, each predecessor task is denoted as pre $(t_i)$ and each successor task is denoted as suc $(t_i)$. Here, the task $(t_i)$ does not start until all predecessor tasks have completed their execution in the system 100. Further, the cloud service providers (CSPs) provide different series of VMs for processing each heterogenous tasks. Such series of VM as represented in Table 1 computes optimized instance series in amazon EC2, Table 2 represents memory optimized instance series in amazon EC2, and Table 3 represents storage optimized instance series in amazon EC2.

TABLE 1

| Computing Optimized Instance Series in Amazon EC2 | | | |
|---|---|---|---|
| VM Types | vCPU | $p_s^k$ (MFLOPS) | $c_s^k$ ($/hr) |
| $c_3$.large | 2 | 8800 | 0.105 |
| $c_3$.xlarge | 4 | 17600 | 0.210 |
| $c_3$.2xlarge | 8 | 35200 | 0.420 |

US 12,657,061 B2

9

TABLE 1-continued

| Computing Optimized Instance Series in Amazon EC2 | | | |
| --- | --- | --- | --- |
| VM Types | vCPU | $p_s^k$ (MFLOPS) | $c_s^k$ ($/hr) |
| $c_3$.4xlarge | 16 | 70400 | 0.840 |
| $c_3$.8xlarge | 32 | 140800 | 1.680 |

TABLE 2

| Memory Optimized Instance Series in Amazon EC2 | | | |
| --- | --- | --- | --- |
| VM Types | vCPU | $p_s^k$ (MFLOPS) | $c_s^k$ ($/hr) |
| $r_3$.large | 2 | 8800 | 0.175 |
| $r_3$.xlarge | 4 | 17600 | 0.350 |
| $r_3$.2xlarge | 8 | 35200 | 0.700 |
| $r_3$.4xlarge | 16 | 70400 | 1.400 |
| $r_3$.8xlarge | 32 | 140800 | 2.800 |

TABLE 3

| Storage Optimized Instance Series in Amazon EC2 | | | |
| --- | --- | --- | --- |
| VM Types | vCPU | $p_s^k$ (MFLOPS) | $c_s^k$ ($/hr) |
| $d_2$.large | 4 | 17600 | 0.69 |
| $d_2$.2xlarge | 8 | 35200 | 1.38 |
| $d_2$.4xlarge | 16 | 70400 | 2.76 |
| $d_2$.8xlarge | 32 | 140800 | 5.52 |

The VM belonging to series s of VM type k is represented as $$\left(vm_s^k\right).$$

The processing capacity of $$\left(vm_s^k\right)$$

is denoted by $$\left(p_s^k\right)$$

and measured in million floating operations per second (MFLOPS). The cost of renting $$\left(vm_s^k\right)$$

for an hour is denoted by $$\left(c_s^k\right).$$

10

Here each VM is rented based on Hour pricing model for example, if the heterogeneous task has processing time of about 1 hour 10 minutes on the VM $$\left(vm_s^k\right),$$

the user pays for 2 hours $$\left(2c_s^k\right).$$

It is to be noted that there is no bound on the number of VMs that can be rented from each CSP.

At step 304 of the method 300 the one or more hardware processors 104 extract by using an extractor module from each heterogeneous task via the one or more hardware processors, a set of parameters comprising of a workload, a transfer bandwidth, an output data size, a task type, a virtual machine (VM) renting cost, and a security level requirement. The extractor module 202 of the system 100 extracts the set of parameters from each heterogeneous task and the workload is considered in the range of about [5000, 50000] One Billion (Giga) Floating Point Operations per Second (GFLOPS), output data size in [10, 100] GB and transfer bandwidth as 0.1 GB/s.

Figure 4A:
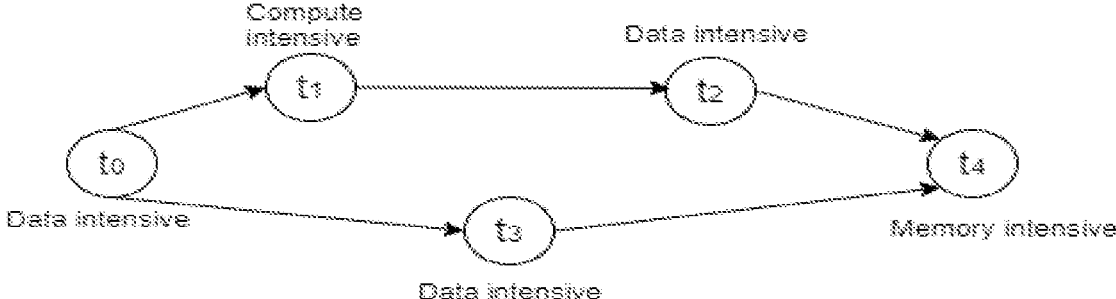
FIG. 4A illustrates an example workflow scheduling problem modelled as directed acyclic graph to process one or more heterogeneous tasks using the system of FIG. 1, in accordance with some embodiments of the present disclosure.
Figure 4B:
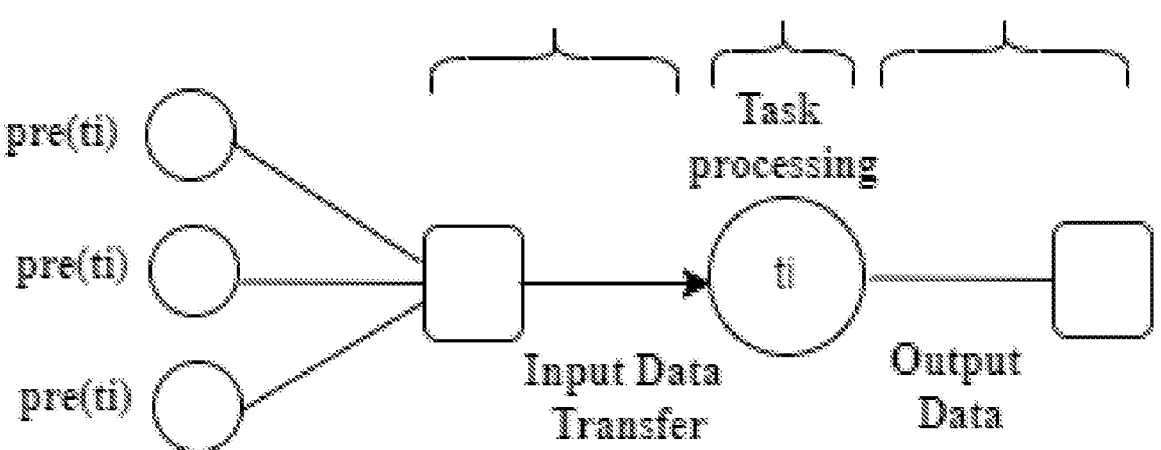
FIG. 4B illustrates an example heterogeneous task processed with appropriate security level requirements for virtual machine using the system of FIG. 1, in accordance with some embodiments of the present disclosure.

At step 306 of the method 300 the one or more hardware processors 104 select by using a combinatorial optimization module 204 from the set of parameters of each heterogeneous task, a set of optimal VM type combination parameters and a set of security level combination parameters and ordering of set of tasks with same start timing using a combinatorial optimization technique. Referring now to the above example, the set of parameters extracted from each heterogeneous task determines optimal VM combinations for each workflow and then computes a workflow execution cost and make span based on the VM combinations. Referring now to FIG. 4B, a security overhead model with workflow tasks running on cloud VMs are vulnerable to different types of security attacks. Such security attacks includes a snooping attack (theft of information), an alteration attack (modification of information), and a spoofing attack (deceitful access to information) and thereof. To protect the VMs against these attacks, security services such as authentication, integrity and confidentiality are used. Here, different security techniques under security services are listed in Table 4-6 as shown below with existing techniques different security level and its associated overhead.

TABLE 4

| Algorithms for Authentication | | |
| --- | --- | --- |
| Algorithms | Security levels: $sl_j^a$ | Overhead (kB/ms) |
| HMAC-MD5 | 0.55 | 90 |
| HMAC-HA-1 | 0.91 | 148 |
| CBC-MAC-AES | 1.00 | 163 |

TABLE 5

| Algorithms for Integrity | | |
| --- | --- | --- |
| Algorithms | Security levels: $sl_j^g$ | Overhead (kB/ms) |
| MD4 | 0.18 | 23.90 |
| MD5 | 0.26 | 17.09 |
| RIPEMD | 0.36 | 12.00 |
| RIPEMD-128 | 0.45 | 9.73 |
| SHA-1 | 0.63 | 6.88 |
| Tiger | 1.00 | 4.36 |

TABLE 6

| Cryptographic Algorithms for Confidentiality | | |
| --- | --- | --- |
| Algorithms | Security levels: $sl_j^c$ | Overhead (kB/ms) |
| SEAL | 0.08 | 168.75 |
| RC4 | 0.14 | 96.43 |
| BLOWFISH | 0.36 | 37.50 |
| Knufu/Khafre | 0.40 | 33.75 |
| RC5 | 0.46 | 29.35 |
| Rijndael | 0.64 | 21.09 |
| DES | 0.90 | 15.00 |
| IDEA | 1.00 | 13.50 |

In general, existing techniques with higher security level have higher overhead than with lower security level. Hence, using lower levels of security services reduces cost and make span but increases attack probability and vice versa. For each heterogeneous task ($t_i$) required security level of three security services are represented as $$\{sr_i^a, sr_i^g, sr_i^c\}$$

where 'a' represents authentication service, 'g' represents integrity service, and 'c' represents confidentiality service. Security levels assigned to each heterogeneous task ($t_i$) are represented as $$\{sl_i^a, sl_i^g, sl_i^c\}$$

and depends on technique chosen from Table 4-6 as mentioned above.

At step 308 of the method 300 the one or more hardware processors 104 generate by using a schedule generator module 206 for the one or more heterogeneous tasks, a schedule for each VM type combination parameters by computing, using a start time-based sorting technique, a set of timing parameters from at least one of (i) the set of optimal VM type combination parameters, and the set of parameters, and (ii) sorting each heterogeneous task based on a start order of initial start time and capturing information of currently utilized VM for cost optimization. The task VM allocation technique allocates each heterogeneous task with the set of optimal VM type combination by computing a time execution cost (TEC) and a total execution time (TET) based on the set of timing parameters.

The set of timing parameters comprises of a start time (ST), an end time (ET), an index array (ID) listing an index of one or more heterogeneous task, a start time array (ST[•]), and an end time array (ET[•]). The VM for each heterogeneous tasks have been traversed which is not adjacent but predecessors to the task. Each heterogeneous task in the DAG are traversed in a given order such as topological sort. During traversal, the processing time of each heterogeneous task is computed and a new VM or a reusable VM is allocated. Here, the reusable VM is for the tasks which require same VM instance series and type which has available idle time. For such VM reuse overall rental cost is reduced when utilizing VM of the predecessor task there is no transfer time. Hence reduction in make span (TET) also occurs. Since, the heterogeneous task are allocated to VM and immediately after its processing time is computed. This is because even if there exists tasks in the workflow whose end time (ET) would be lower than the start time (ST) of task (which are completed earlier), those tasks might not have been traversed yet. Ideally most of the used VM are not stored at different stages during scheduling, and there is no VMs reuse option. The reuse option available is utilization of used VMs by any of its predecessor task of the same instance series and type and if that is unavailable, then a new VM has to be rented.

The start time-based sorting technique computes the start time (ST) and the end time (ET) of one or more heterogeneous tasks and sorts the tasks based on their initial (ST) as described in Table 7. The combination of VM types and security levels are used as input to the start time-based sorting technique and these combinations are provided by the combinatorial optimization technique. The VM instance series for each heterogeneous task is fixed. For example, computation intensive task requires computes intensive VM.

TABLE 7

| Start time-based sorting technique |
| --- |
| Input : as VM[n], a[n], g[n], c[n] β VMs, a, g, c service levels for n tasks |
| Input : P[n],W[n],D[n] β processing capacity, workload, output data size, VM renting cost for n tasks |
| Initialize index array ID[n] = {1,2,3,..,n} |
| for i=1,2,...,n tasks do |
|    calculate TT[i], ExT[i], SC[i] as per Equation 1,2 and 3 |
| end for |
| for i=1,2,...,n tasks do |
|    ST[i] = max {ET[j]; j ∈ pre(i) } |
|     Calculate ET[i] as per Equation 5 |
|     Update $ST_r$ and $ET_r$ as $ST_r$[i] = ST[i], $ET_r$[i] = ET[i] |
| end for , |
| Sort ST.sort ET,ID based on the order of sorted ST |
| Output : ST,ET,ID,$ST_r$, $ET_r$ |

Here, different combination of VM types are explored to obtain optimal combination based on the processing capacity, the workload, the output data size of tasks are also used as input to the start time-based sorting technique. Initially, the index array (ID) would contain index of each heterogeneous task in the order they have started as ID[i]=i. The start time-based sorting technique performs the following steps, Step 1: obtain the set of VM type combination and the set of parameters.

Step 2: initialize the index array for storing the start order of each heterogenous task.

Step 3: compute for each heterogeneous task, (i) a total transfer time (TT), (ii) an execution time (EXT), and (iii) a security overhead (SC).

Step 4: update the start time array (ST[•]) of each heterogeneous task with maximum end time array (ET[j]) of its predecessor task and store in the start time array (ST[•]).

Step 5: compute the end time array (ET[•]) which is the sum of start time array (ST[•]) and a total processing time (PT), wherein the total processing time is the sum of the security overhead (SC), execution time (EXT), and the total transfer time (TT).

Step 6: update a start time reserve array (ST) with the start time array (ST[•]) value and an end time reserve array (ET$_r$) with the end time array (ET[•]).

Step 7: sort the start time (ST), the end time (ET), and the index array (ID) based on sorted order of start time.

Here, the total input data transfer time, the execution time and the security overhead for each tasks is computed (Table 7) using Equations 1-3 and the security overhead for three services are computed. The overall security overhead SC(t$_i$) for the heterogeneous task (t$_i$) is the sum of individual security overheads as mentioned below in Equation 1, $$SC(t_i) = SC^a(t_i) + SC^g(t_i) + SC^c(t_i) \qquad \text{Equation 1}$$

Each heterogeneous task (t$_i$) is processed to obtain the output data from VM of its predecessor task (t$_j$) needs to be transferred to the VM of (t$_i$). Total time to transfer all predecessor's data to the VM of task (t$_i$) is denoted as (TT$_i$), and is computed below with Equation 2, $$TT(t_i) = \sum_{t_j \in pre(t_i)} d_j^o / B \qquad \text{Equation 2}$$

Where, $$d_j^o$$

is the output data size of task t$_j$(t$_j \in$ pre (t$_i$)) and 'B' is the transfer bandwidth measured in GBIs. It is to be noted that two $$d_j^o = 0$$

if (t$_i$) reuses the same VM instance allocated to (t$_j$) since data transfer does not happen when VM is reused. Total transfer time for start tasks is assumed to be zero and execution time ExT $$\left(t_i, vm_s^k\right)$$

for each task (t$_i$) on $$VM\ vm_s^k$$

is denoted below in Equation 3, $$ExT\left(t_i, vm_s^k\right) = \frac{w_i}{p_s^k} \qquad \text{Equation 3}$$

Where, W$_i$ is the workload of task (t$_i$). Total processing time PT $$\left(t_i, vm_s^k\right)$$

for task t$_i$ includes security overhead and transfer time as denoted below using Equation 4, $$PT\left(t_i, vm_s^k\right) = TT(t_i) + ExT\left(t_i, vm_s^k\right) + SC(t_i) \qquad \text{Equation 4}$$

The start time of each heterogeneous task except for the initiated task is the end time of its predecessor. The end time of such heterogeneous task is the sum of the start time and the total input data transfer time, the task execution time and the security overheads as represented in Equation 5 and is shown in Table 7.

$$ET(t_i) = ST(t_i) + PT\left(t_i, vm_s^k\right) \qquad \text{Equation 5}$$

If the task t$_i$ has the start time ST(t$_i$) and the end time ET(t$_i$), during VM allocation due to transfer time adjustments, separate start time arrays (ST$_r$) and end time arrays (ET$_r$) are used to remember the order in which tasks would start. The start time arrays (ST$_r$) and the end time arrays (ET$_r$) store the same value as the start time ST and the end time ET respectively as shown in Table 8. The start time arrays (ST$_r$) is sorted in ascending order. Arrays end time ET and the index array ID are sorted based on sorted start time ST such that ST[i], ET[i], and ID [i] refers to the start time, the end time and the index number of the same task. The task VM allocation technique has the array ST[•], ET, STT, ET, and the index array ID as output. The task VM allocation technique (Table 8) allocates heterogeneous tasks to VM. Since the tasks are sorted based on the start time (ST) before renting new VM and the idle time on all VMs used by tasks is started and completed before it reuses.

TABLE 8

| Task VM allocation technique |
|---|
| Input : ST, ET, ID, ST$_r$, ET$_r$ |
| Initialize TEC = 0 |
| Initialize It[n] = {0, 0, 0 . . . 0} |
| For i = 1, 2, . . . , n tasks do |
|    Search for the $vm_s^k$ where maximum cost reduction is available |
|    Set idle time on $vm_s^k$: IT[j] = 0 if reused by i |
|    Compute new idle time for i in IT[i] after i completes |
|    Increment TEC as per Equation 6 |
|    Set $ET[i] = \left(ET[i] - \frac{DJ[i]}{B*60}\right)$ if $\exists j (j \in pre(i))$ |
|      $\forall k (k \in succ(i)$:Set ST [k] = ET[i] if ST$_r$ [k] = ET$_r$ [i] ) |
|      Compute ET [k] = ST[k] + (ET$_r$ [k] − ST$_r$ [k]) |
|      Sort ST, sort ET, ID based on sorted ST |
| End for |
| Calculate TET = max (ET)/60 in hours as per Equation 7 |
| Output: TEC, TET |

If the initial start time and the end time of the heterogeneous tasks are changed at different stages during VM allocation due to transfer time adjustments. Such tasks are updated accordingly and always kept sorted based on current values of the start time. The task VM allocation technique performs the following steps, Step 1: initialize with zero, the total execution time and an idle time array (IT) for storing information.

Step 2: search for unutilized optimal VM type processed for prior heterogeneous task and is currently available to process next heterogeneous task with low VM renting cost and idle time, if the heterogeneous task reuses the VM type used by corresponding predecessor task then reduction in VM renting cost is available with the idle time and data transfer cost is excluded, and if, the heterogeneous task reuses the VM type VM used by corresponding non-predecessor task, then reduction in cost is for only available idle time.

Step 3: rent a new VM type for each heterogeneous task when reusable VM type is unidentified.

Step 4: compute a new idle time for the current heterogeneous task which reuses the VM type used by the prior heterogeneous task and updating idle time array (IT[j]) for the current heterogeneous task with an identifier and the new idle time array with current heterogeneous task (IT[i]).

Step 5: compute for each heterogeneous task, the total execution cost, the total execution time, a task risk probability, a risk probability, and a total risk rate.

Step 6: increment the total execution cost for the workflow for processing the current heterogeneous task by updating the data transfers.

Step 7: sort the end time, the index array and the start time and compute the total execution cost for the one or more heterogeneous task based on maximum end time.

Step 8: compute the end time based on summing the start time with the difference value of the end time array and the start time array.

The output of the start time based sorting technique is used as input to the task VM allocation technique. Initially, time execution cost (TEC) is kept 0 (Table 8) and array IT for storing idle time information is initialized. Before allocating any task i to new VM, all possible unutilized VMs of the same instance series and type are explored for reuse. If the task reuses VM used by an adjacent task then reduction in cost is both for available idle time on VM and no data transfer between the tasks. If the task reuses the VM used by a non-adjacent task then reduction in cost is only for the idle time on the VM. The task allocated to the VM gets maximum reduction. If such reusable VM is found, heterogeneous task is allocated and since the existing idle time (after the last task j has completed processing on it) is used up, IT [j] is set to 0 in line 6. After i has completed processing (reusing an existing VM or renting a new VM), the value of IT [i] is updated. The TEC variable is incremented with the processing cost for i. The total execution cost (TEC) for the entire workflow is computed based on the difference value between the start time, the end time as mentioned below in Equation 6, $$TEC = \sum_{i=0}^{n-1} \left[ ET(t_i) - ST(t_i) - IT(t_j, vm_s^k) \right] c_s^k \qquad \text{Equation 6}$$

Where, IT is the idle time. Since VMs are borrowed on hourly basis, there exists a time difference between the time when the task processing completes and the end of that hour slot which is known as idle time.

In one embodiment illustration of cost and time computation has been provided by considering two tasks such as $t_i$ and $t_j$ with same VM instance series. Let $t_j \in$ pre $(t_i)$ and $t_j$ be the start task ($ST(t_j)=0$). It is assumed that such tasks are mapped to the same VM type and end time $ET(t_i)=100$,

16

$ST(t_j)=100$. Also, the end time of task $ET(t_i)=225$ (all values are in minutes). The VM renting cost for $t_j$ is to be paid for 2 hours ($\lceil 100/60 \rceil=2$). The idle time (IT) on the VM is 20 minutes (120–100=20). Now, there are two possible cases, 1. If $t_i$ is allocated to the new VM, then renting cost is for 3 hours ([225–100]/60]=3). If $t_i$ reuses the VM of $t_j$ for 20 minutes, the VM renting cost for 2 hours $\lceil (225-100-20)/60 \rceil$ 2. If i reuses an unutilized VM used by an adjacent task, then no data transfer is required between the task and current value of ET[i] would be lower than the initial value of ET[i].

The start time ST of those successor tasks of i which could start after i has completed are also updated along with their ET(Table 8). It is to be noted that not all successor tasks of i can start after i completes. Some of them might have other predecessor tasks which could complete after i. The start time ST is always kept sorted and end time ET and index array ID is sorted based on the order of sorted ST. TET for the workflow is obtained as per Equation 7. The total execution time (TET) is computed based on the maximum end time duration of each heterogeneous task.

$$TET=\max\{ET(t_i)|t_i \in T\} \qquad \text{Equation 7}$$

Also, the ST of a workflow is assumed to be 0 and hence the make span of workflow task is same as the Total Execution Time (TET).

Risk analysis is where the tasks come under different attacks during scheduling and security services are provided to mitigate risk. For each task $t_i$, the risk probability for attack even after providing the $l^{th}$ security service (due to the difference in required and provided security level) is assumed to follow a Poisson distribution. Task risk probability is computed for each heterogeneous task using an exponential function of average arrival rate of current security threat per time slot ($\lambda$), a difference between a required security level $$(sr_i^l)$$

and a provided security level $$(sl_i^l)$$

for the heterogeneous task, and time slot per hour, and the processing time of heterogeneous task on the VM type as depicted below in Equation 8, $$P(t_i, sl_i^l) = 1 - \exp\left(-\lambda^l (sr_i^l - sl_i^l) N(t_i)\right) \qquad \text{Equation 8}$$

$N(t_i)$ is the number of time slots (each slot is an hour) for which $t_i$ is executed on the VMs. The arrival rates: $\lambda_a=3.0$, $\lambda_g=2.5$, $\lambda_c=1.8$ give the average number of snooping, alteration and spoofing attacks, respectively per time slot.

Risk probability for all security level requirements is computed using the task risk probability value as denoted below in Equation 9, $$P(t_i) = 1 - \prod_{l \in \{a,g,c\}} \left(1 - P(t_i, sl_i^l)\right) \qquad \text{Equation 9}$$

Total risk rate for all security levels are computed using the risk probability by linearizing risk rate constraints when the total risk rate is less than or equal to optimization constraints using Equation 10, $$P(T) = 1 - \prod_{t_i \in T} (1 - P(t_i)) \qquad \text{Equation 10}$$

The value of P(T) must be lower than the risk rate threshold $P_c (P_c \in [0, 1])$, which is the permissible risk rate of the workflow. Thus, $P(T) \leq P_c$ must be constraints in optimization. The constraint $P(T) \leq P_c$, can be also written as $1-P_c \leq 1-P(T)$ and stated below in Equation 11, $$\prod_{t_i \in T} (1 - P(t_i)) \geq 1 - P_c \qquad \text{Equation 11}$$

On further expanding the LHS, then Equation 12 and Equation 13 is derived, $$\prod_{t_i \in T} \prod_{l \in \{a,g,c\}} \left(1 - P\left(t_i, sl_i^{ll}\right)\right) \geq 1 - P_c \qquad \text{Equation 12}$$

$$\prod_{t_i \in T} \prod_{l \in \{a,g,c\}} \exp\left(-\lambda^l\left(sr_i^l - sl_i^{ll}\right)N(t_i)\right) \geq 1 - P_c \qquad \text{Equation 13}$$

Taking log on both sides then inequality to derive Equation 14, $$\sum_{t_i \in T} \sum_{l \in \{a,g,c\}} -\lambda_1\left(sr_i^l - sl_i^{ll}\right)N(t_i)) \geq \log(1 - P_c) \qquad \text{Equation 14}$$

The security model is considered as the number of hours for each task is to use the VM is less than or equal to one N $(t_i)=1$. Such equations are derived to prevent under estimation of risk by introducing the correction factor N $(t_i)$, such security equations would result in higher values of risk rate than the Equation 14 for the same security levels. Security levels to tasks are lower than required for violation of risk rate constraint whereas higher security levels result in high cost and make span.

Figure 5A:
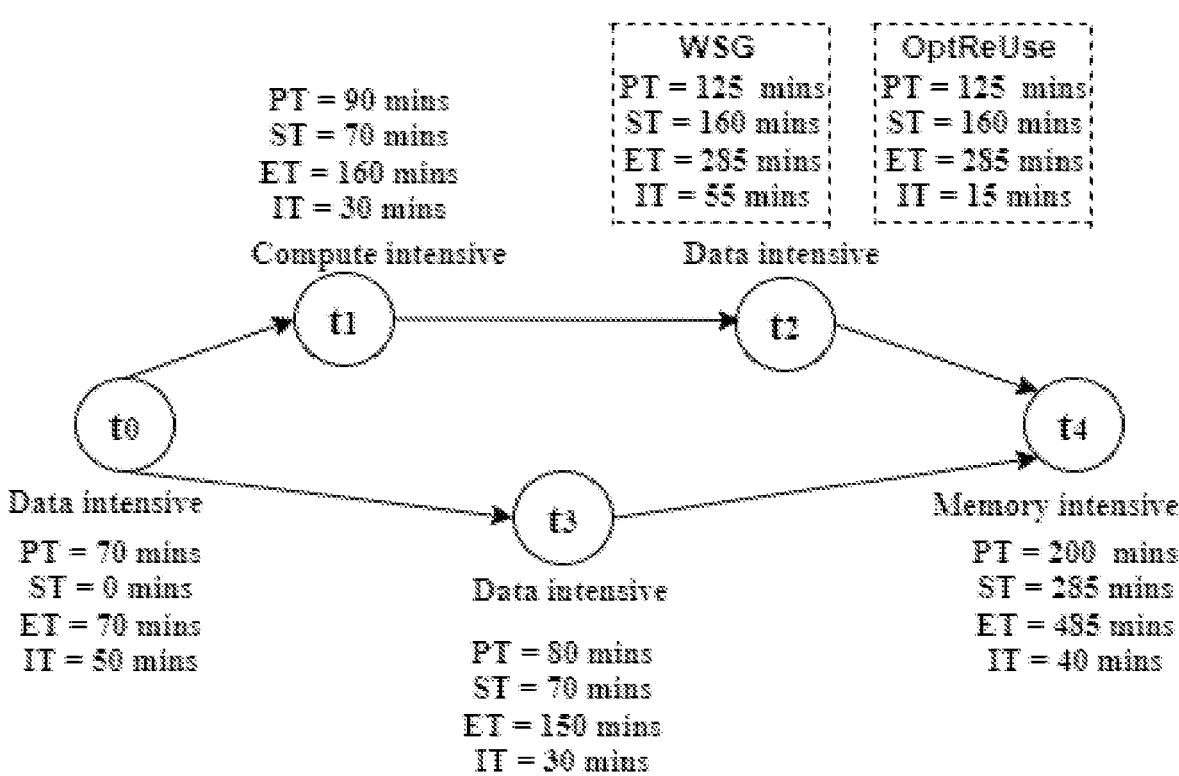
FIG. 5A illustrates a pictorial representation of scheduled workflow instances with virtual machines task processing time for the one or more heterogeneous tasks using the system of FIG. 1, in accordance with some embodiments of the present disclosure.

FIG. 5A illustrates a pictorial representation of scheduled workflow instances with virtual machines task processing time for the one or more heterogeneous tasks using the system of FIG. 1, in accordance with some embodiments of the present disclosure. FIG. 5A depicts workflow instances by considering an example, where tasks are traversed by traversal order, such as topological sort $(t_0, t_3, t_1, t_2, t_4)$ and simultaneously allocated to VMs based on the VM types selected by the combinatorial optimization technique. This enables $t_3$ to reuse the VM allocated to $t_0$ avoiding extra data transfer delays. For to and $t_3$, total cost to be paid is for 150 minutes (i.e., 3 hours) and for the remaining tasks new VMs need to be borrowed. The task $t_2$ belongs to the same VM instance series (data intensive), a new VM is borrowed for 125 mins (i.e., 3 hours). The VM on which $t_3$ is processed has idle time of 30 minutes (180–(70+80)).

Task $t_2$ which is non-adjacent task to $t_3$ can also avail this idle time. It is to be noted that the task $(t_0, t_3$ and $t_2)$ belongs to the same instance series. But as task $t_2$ starts only after completion of task $t_1$ (ST=160 mins). The available idle time on VM for $t_3$ is 20 minutes, which can be utilized by task $t_2$.

Hence, the VM rental cost for the task $t_2$ has to be paid only for 105 minutes (125–20)) (2 hours), which is lower than the cost paid for $t_2$ using the method of the present disclosure. Along with this strategy, task ordering has significant impact of VM reuse. In the subsequent embodiment, elaboration of ordering the tasks belonging to the same VM instance series can further reduce the VM rental cost.

Figure 5B:
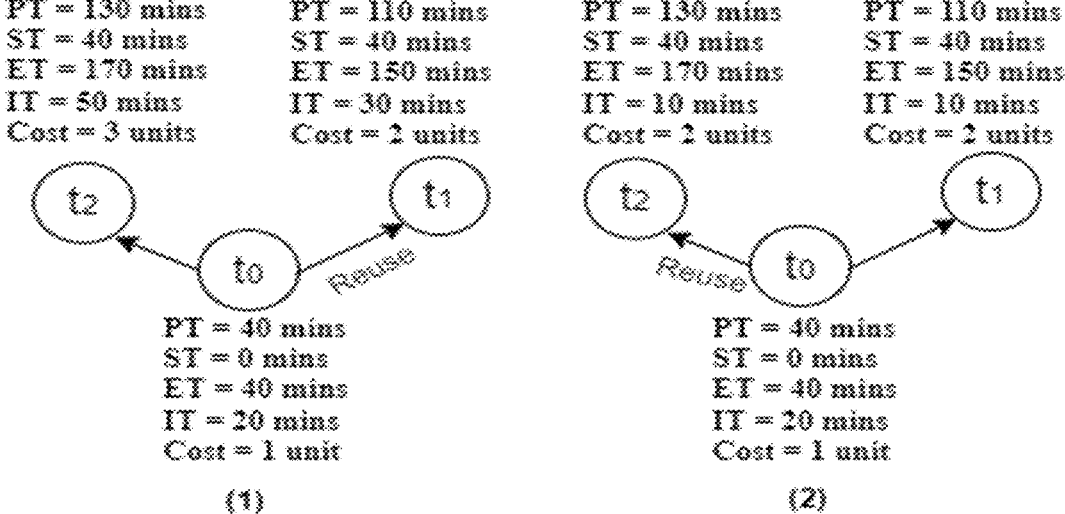
FIG. 5B illustrates an example pictorial representation of scheduled workflow impact order selection while reusing virtual machines for the one or more heterogeneous tasks using the system of FIG. 1, in accordance with some embodiments of the present disclosure.

FIG. 5B illustrates an example pictorial representation of scheduled workflow impact order selection while reusing virtual machines for the one or more heterogeneous tasks using the system of FIG. 1, in accordance with some embodiments of the present disclosure. Considering the heterogeneous tasks $t_0$ and $t_3$ as shown in FIG. 5B where to is predecessor of $t_3$. Both tasks require same VM instance series (date intensive) and are mapped to the same VM type. Here, $PT(t_0)$ be 70 and of $PT(t_3)$ be 80 and all time values are in minutes. Here, $t_0$ be the start task and, $ST(t_0)=0$, $ET(t_0)=70$, $ST(t_3)=70$ and $ET(t_3)=150$. The renting cost for processing task to on the VM has to be paid for 2 hours ([70/60]). The idle time (IT) on the VM is 50 minutes (120–70). It is to be noted that two possible criteria such as,
1. If $t_3$ is allocated to new VM, then the renting cost is for 2 hours ([80/60]).
2. If $t_3$ reuses the VM of $t_1$ for 50 minutes, then the VM renting cost is for 1 hour [(150–70–50)/60].

Thus, if each task is allocated to separate VM then it leads to utilization of the resources. For heterogeneous task with similar instance type, VM can be reused, resulting in reduced rental costs and lower data transfer delays. The tasks $(t_0, t_1$ and $t_2)$ which are part of the workflow, and these tasks belong to the same VM instance series (data intensive) and least expensive VM types are selected for these tasks. The first workflow in FIG. 5B displays the task $t_1$ reuses the VM and in second workflow task $t_2$ reuses the VM of task $t_0$ where, If $t_1$ reuses the VM of $t_0$, then the total cost to be paid for $t_0$ and $t_1$ is for 150 minutes (3 units) and the cost for $t_2$ has to be paid for 130 minutes (3 units). Thus, the total cost to be paid for all the three tasks is 6 units.

If $t_2$ tasks has reused the VM of $t_0$, then the total cost to be paid for $t_0$ and $t_2$ is for 170 minutes (3 units) and the cost for t1 is for 110 minutes (2 units). Thus, the total cost for second workflow is 5 units.

Thus, the task order impacts the VM reuse and cost. In this method, along with VM re-utilization across adjacent and non-adjacent task, benefits due to task ordering is considered.

Figure 6A:
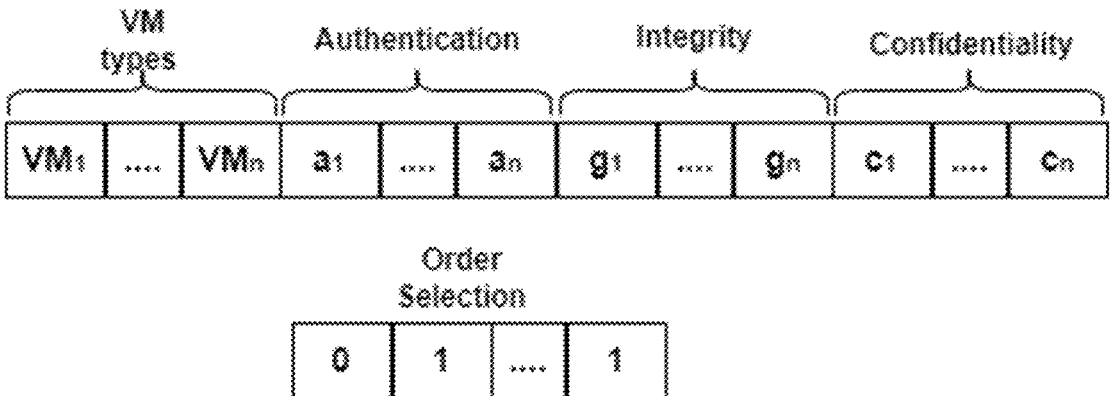
FIG. 6A illustrates an example chromosome structure for selection of virtual machine type combination and security services for each task in the workflow, using the system of FIG. 1, in accordance with some embodiments of the present disclosure.

FIG. 6A illustrates an example chromosome structure for selection of virtual machine type combination and security services for each task in the workflow, using the system of FIG. 1, in accordance with some embodiments of the present disclosure. Here, random sampling with tournament selection with simulated binary crossover (prob=0.9) operation and polynomial mutation operation are adapted. The chromosome coding strategy for ordering heterogeneous task with the same start time is shown in FIG. 6A consists of set of values such as,
1. The first set of n values represent the chosen VM type for each task and
2. The next three sets represent the chosen authentication, integrity and confidentiality security algorithms for each of the tasks.

VM types and three security levels have unequal number of values. From Tables 4, 5 and 6, we can observe that a, g and c security services have 4,8 and 9 levels respectively (including the 0th level or no security in each case). The size is denoted by variable $S_q$ (q=a, g, c) where $S_a$=4, $S_g$=8, $S_c$=9.

Similarly, another variable $S_{vm}$ denotes the number of VM types for a VM series like $S_{vm}$=4. The experimentally constructed chromosome variable mapping is shown in Table 10.

TABLE 10 chromosome variable mapping for GA

| Variable type | Domain rank | Corresponding value rank |
|---|---|---|
| Security level | [r, r + 1] | r if r < $s_q$ |
| Security level | [r, r + 1] | Highest level r if r ≥ $s_q$ |
| VM type | [r, r + 1] | r % $S_{vm}$ |

Considering common domain D⟹[0-9] and divide it into sub domains like [0, 1), [1, 2), . . . , [8.9)asmax ($S_q$)=9 and a ranking variable r is also considered. For example, if r=3, for D it denotes the sub domain [2, 3]; for a, g, c service levels, which denotes second security level in each case (as 0th level or no security is included) and for VM types it denotes the 2×large VM type. VM series for tasks are always fixed. Since most of the tasks will have $$sl_i^q = 1$$

or close to 1 to satisfy the risk rate constraint, this mapping scheme gives optimal results. Genetic algorithms (GA) is executed for 1000 generations with population of 150 in each generation. The package used for GA is pymo.

In one embodiment for particle swarm optimization (PSO) parameters and coding strategy, initial velocity is kept at zero and the initial parameters are w=0.64, $c_1$=0.5, $c_2$=2.5. The parameters are adaptive which means they keep changing at each iteration. The PSO particle coding strategy is similar to GA chromosome coding strategy with a difference in the common domain. In PSO, the common domain D is replaced by four domains $D_{vm}$⟹[0, 4), $D_a$⟹[0, 4), $D_g$⟹[0, 8) and $D_c$⟹[0, 9). Each of these domains are divided into sub-domains as stated in GA. For example, if r=3 for $D_a$, $D_g$ and $D_c$ and it denotes the sub domain [2, 3]; for a, g, c service levels, it denotes the second security level in each case and for VM types, it denotes the 2×large VM type and mapping is shown in Table 11.

TABLE 11 chromosome variable mapping for PSO

| Var_type | Domain rank | Corresponding value rank |
|---|---|---|
| Security level | [r, r + 1] | r |
| VM type | [r, r + 1] | r |

The PSO is run for 1000 generations and the number of particles in each generation was 150. The package used for GA is pymo.

Initial Population Generation: For initial population in case of both GA and PSO, security levels for tasks for all three security services are assigned with prob=0.95 for the highest security level and 0.05 for the second highest security level for that corresponding security service. For VM type, the lowest two VM types were randomly assigned with selection probability of 0.85 for large and 0.15 for ×large.

FIG. 6B illustrates a performance comparison on standard benchmark workflows of a laser interferometer gravitational wave observatory (LIGO), a sRNA identification protocol using high throughput technology (SIPHT) and a Cyber-Shake using the system of FIG. 1, in accordance with some embodiments of the present disclosure. Three standard scientific workflows are considered as shown in FIG. 6B and described in Table 12.

TABLE 12

Standard Workflow benchmark values of task distribution

| Workflow | Computation intensive | Memory intensive | Data intensive |
|---|---|---|---|
| Laser interferometer gravitational wave observatory (LIGO) | 20% | 60% | 20% |
| SRNA identification protocol using high throughput technology (SIPHT) | 60% | 20% | 20% |
| CyberShake | 20% | 20% | 60% |

For experimentation analysis, each task has workload chosen randomly in the range [5000,50000] MFLOP and output data in the range [10,1000] GB. The bandwidth is 0.1 GB/s.

In one embodiment, for scheduling multiple workflows instance simultaneously is demonstrated using two instances of CyberShake (known in the art technique) workflow where all the tasks are assigned with the least expensive VM types. Total cost and make span for scheduling the two workflow instances are ($73.56, 46.72 minutes) and ($67.66, 51.125 minutes) and the method utilizes total cost and make span for the two workflow instances are ($72.876, 46.72 minutes) and ($67.35, 51.125 minutes). If two instances are treated as two unconnected components of a single workflow graph. Then, total cost and make span is obtained in ($137.45, 51.125 minutes). This cost is lower than the combined cost of scheduling both the workflow instances separately. This cost benefit while scheduling workflow instances simultaneously cannot be achieved as scheduled workflow traverses the workflow graph by given traversal order (topological sort) and simultaneously allocates VM to tasks. Thus, it does not require tasks to be connected by an edge for VM reuse between them. In real world scenarios, there may be a requirement to schedule multiple workflows simultaneously. Also, optimization algorithms selects combination of high and low processing capacity VMs when the scheduling needs to be complete within a given deadline. The cost benefit in such cases would be significant.

Figure 7A:
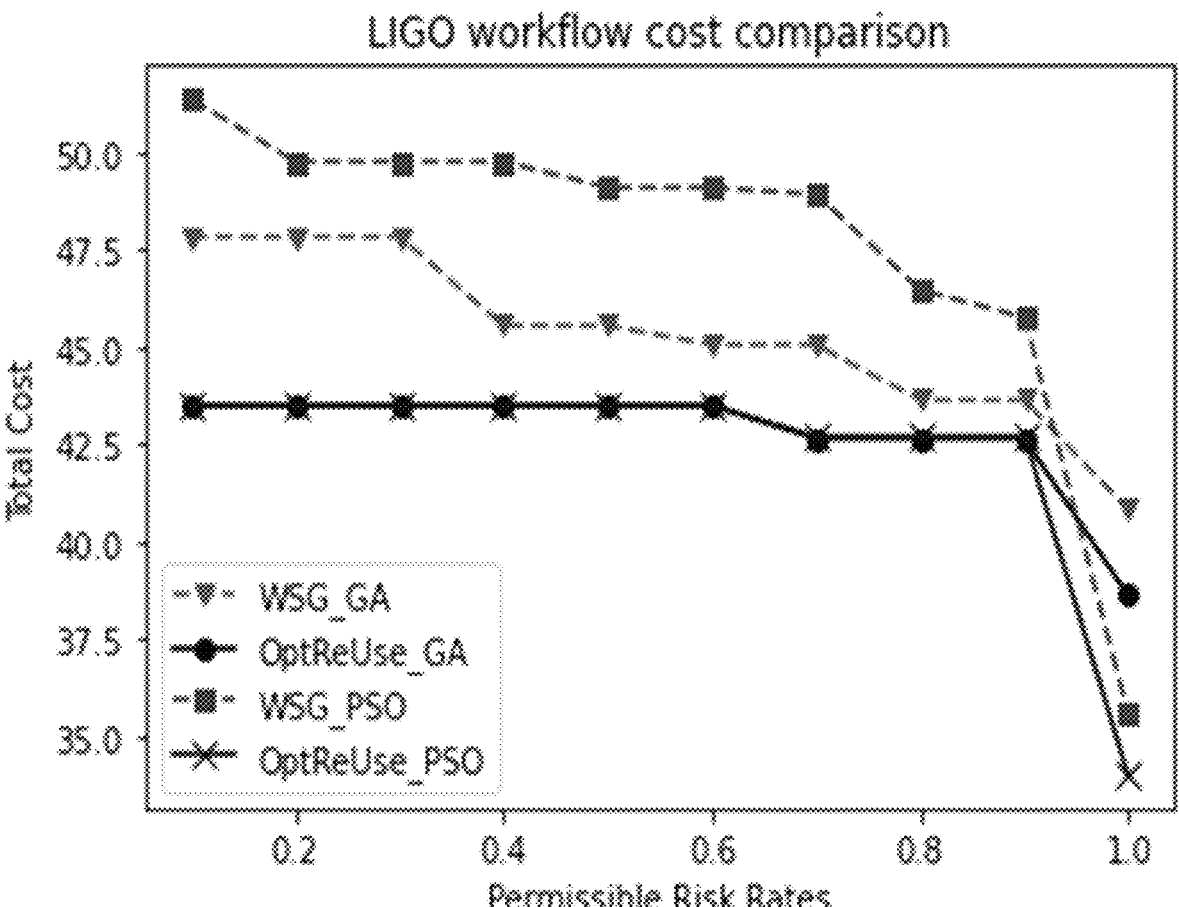
FIG. 7A.
Figure 7B:
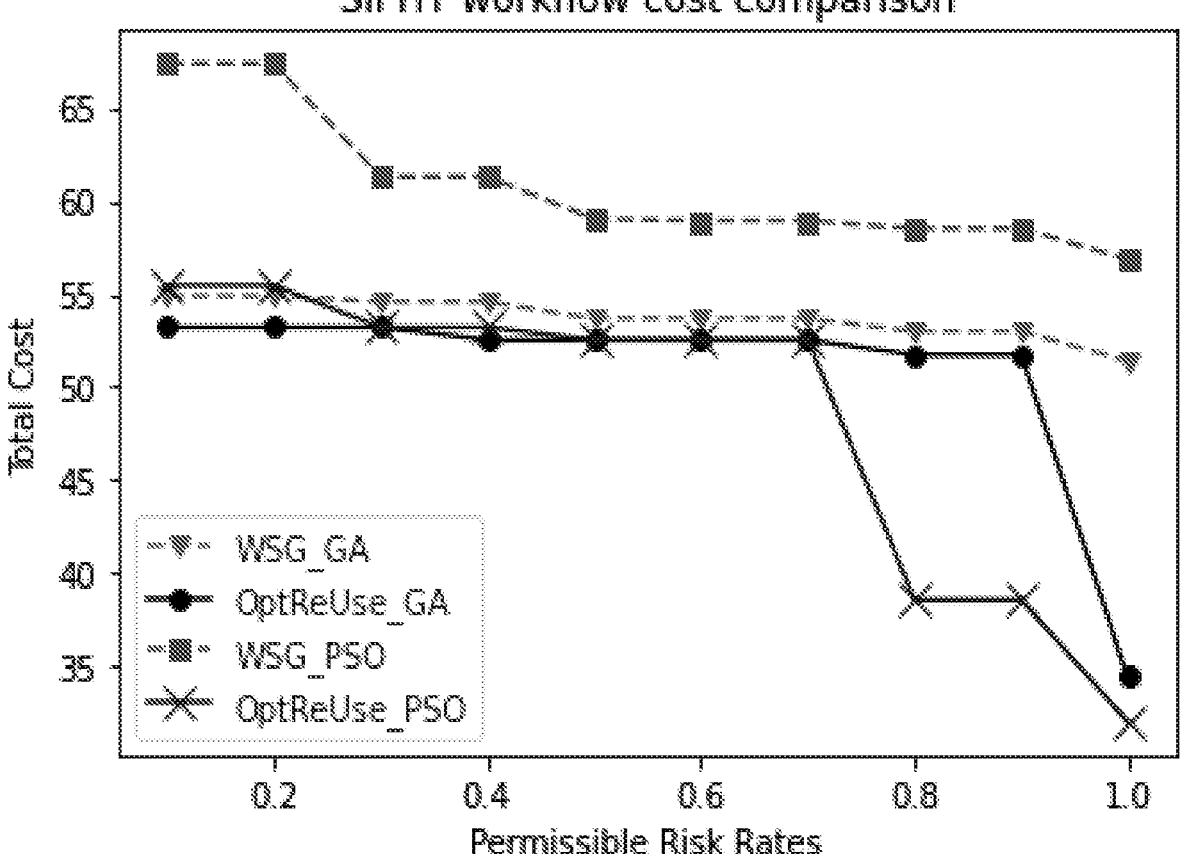
FIG. 7B and FIG. 7C illustrates a graphical representation of workflow schedulers comparing performance with existing workflow techniques such as LIGO, CyberShake, and SIPHT having virtual machines using the system of FIG. 1, in accordance with some embodiments of the present disclosure, wherein WSG_GA represents Workflow Schedule Generation Genetic Algorithms, OptReuse_GA represents Optimum Reuse Genetic Algorithms, WSG_PSO represents Workflow Schedule Generation Particle Swarm Optimization, OptReuse_PSO represents Optimum Reuse Particle Swarm Optimization.
Figure 7C:
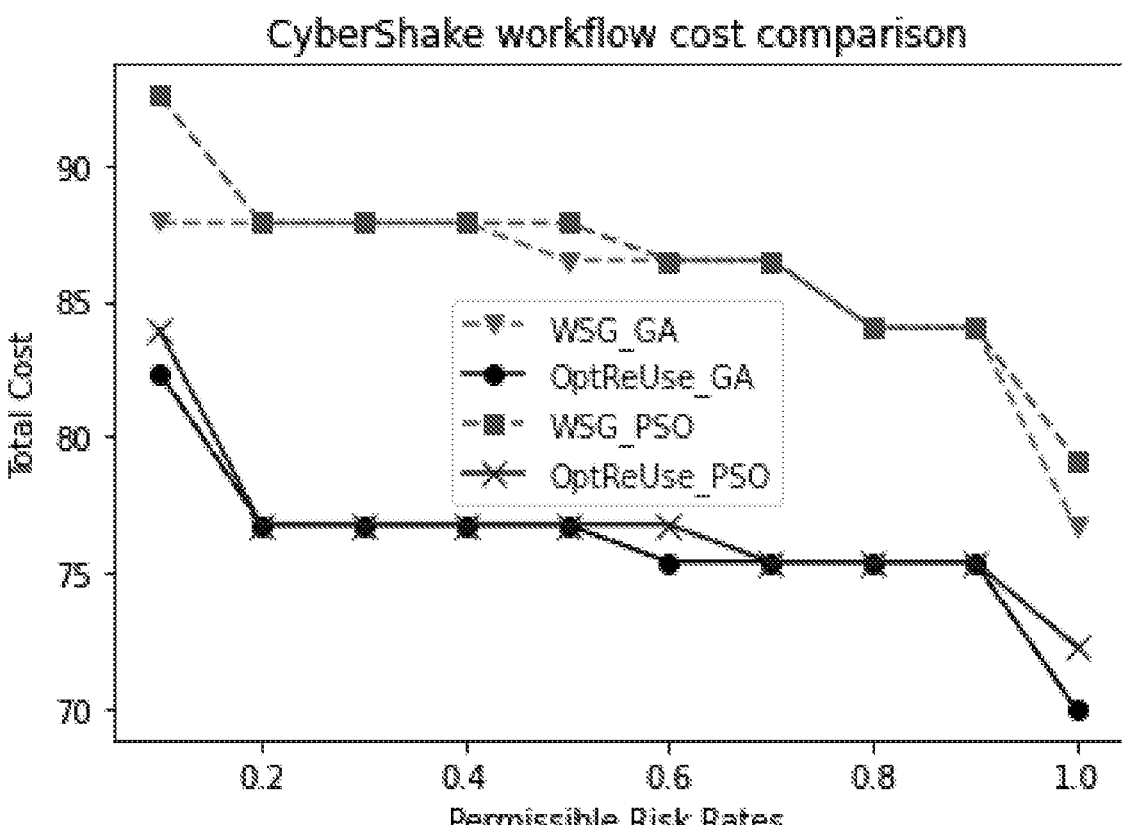

FIG. 7A. FIG. 7B and FIG. 7C illustrates a graphical representation of workflow schedulers comparing performance with existing workflow techniques such as LIGO, CyberShake, and SIPHT having virtual machines using the system of FIG. 1, in accordance with some embodiments of the present disclosure. FIG. 7A represents LIGO where average percentage reduction in costs with 8.07%. FIG. 7B depicts CyberShake is a data intensive workflow requiring mostly storage optimized VMs and they are the costliest VMs. Therefore, in CyberShake workflow more VMs are reused compared to LIGO known in the art technique. Hence, the average percentage reduction in cost is 11.2%. FIG. 7C depicts SIPHT workflow is a computation intensive workflow requiring mostly the cheapest compute optimized VM. But it has the highest number of tasks which makes it possible to search for more reuse cases. Therefore, for SIPHT the average percentage reduction in cost is 13.15%.

With increase in value of $P_c$, TEC deceases because of the selection of lower security levels. The makespan in all the three benchmark test cases for all the $P_c$ values in the range [0.1, . . . , 0.9] does not change significantly {LiGO=45.47, SIPHT=53.81, CyberShake=102.2} minutes. FIG. 7A, FIG. 7B and FIG. 7C depicts the cost of GA optimization, GA optimization, PSO optimization with workflow schedule generation and PSO optimization and are represented as GA original, GA modified, PSO original, PSO modified respectively for each workflow. All values are in $. It is observed that for all the workflows the method of the present disclosure gives lower cost. For lower values of permissible risk rate $P_c$, the permitted risk is low and hence most tasks are assigned with security levels close to the highest security level and for all security services which results in higher cost. As $P_c$ increases, the permitted risk is higher, and tasks have lower security levels and hence total cost decreases. The optimal VM type combination for a workflow remains the same for all ten values of $P_c$. The change in combination of security levels results in different values of cost with changing values of $P_c$. The cost of optimization for Cyber-Shake workflow is highest because 60% of the tasks in CyberShake are data intensive which requires storage optimized VM series (costs higher than other types of VM series). Table 13 represents workflow tasks and levels, and Table 14 represents VM reuse it is observed that the VM reuse using the method of the present disclosure is highest for SIPHT and lowest for CyberShake.

TABLE 13

| Workflow tasks and levels | | |
| --- | --- | --- |
| Workflow | No. of tasks | No. of levels |
| LIGO | 22 | 6 |
| SIPHT | 30 | 6 |
| Cybershake | 20 | 4 |

TABLE 14

| VM reuse | | |
| --- | --- | --- |
| Workflow | VM Reuse | VM Reuse |
| LIGO | 6 | 13 |
| SIPHT | 1 | 8 |
| Cybershake | 4 | 6 |

The method of the present disclosure results higher VM reuse for workflows with higher number of workflows (increased scope of reuse) with higher levels. The average cost benefit obtained is 14.6%, 19.67% and 5.85% for the LIGO, the SIPHT and the CyberShake respectively.

Figure 8:
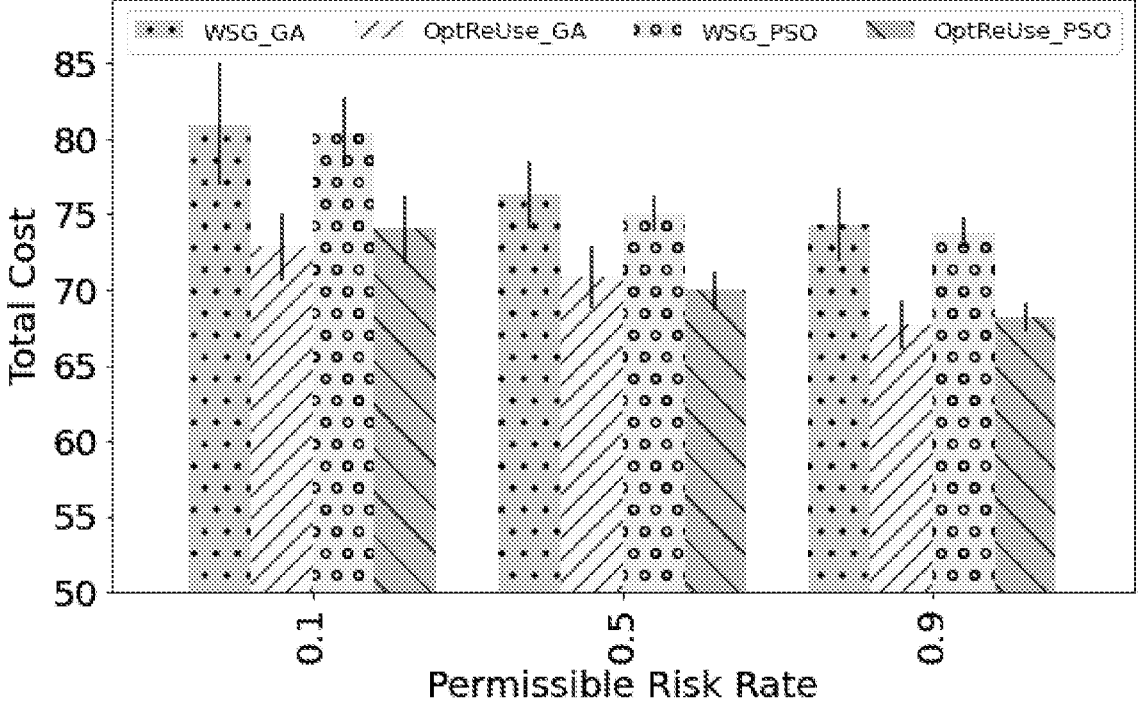
FIG. 8 illustrates average performance of an example schedules workflow for each heterogeneous task with mean cost versus margin of error using the system of FIG. 1, in accordance with some embodiments of the present disclosure, wherein WSG_GA represents Workflow Schedule Generation Genetic Algorithms, OptReuse_GA represents Optimum Reuse Genetic Algorithms, WSG_PSO represents Workflow Schedule Generation Particle Swarm Optimization, OptReuse_PSO represents Optimum Reuse Particle Swarm Optimization.

FIG. 8 illustrates average performance of an example schedules workflow for each heterogeneous task with mean cost versus margin of error using the system of FIG. 1, in accordance with some embodiments of the present disclosure. FIG. 8 demonstrates average performance of the method over number of instances. Here, 75 workflow instances are generated for CyberShake known in the art technique. Each instance having different task workload and output data size and three (high, medium, low) permissible risk rates $P_c$ observe the impact of security levels on workflow execution cost and makespan. The results are demonstrated for different combinations of scheduling, combinatorial optimization and permissible risk rate $P_c$ with {0.1, 0.5, 0.9}. FIG. 8 represents mean cost and margin of error for confidence interval of 95%. It is observed that lower mean cost and margin of error compared to the method of the present disclosure. When $P_c$ is increased, difference between the required and security levels are increased. Hence, with the selection of lower security levels (with lower overheads), overall cost is reduced.

In one preferred embodiment, considering an example where the system 100 simultaneously receives the set of workflows referred as multiple workflows for scheduling instance. Such instances are compared with CyberShake, where all the tasks are assigned with least expensive VM types.

For workflow schedule the total cost and make span for the two workflow instances are ($73.56, 46.72 minutes) and ($67.66, 51.125 minutes).

The system 100 computes the total cost and make span for the two workflow instances such as ($72.876, 46.72 minutes) and ($67.35, 51.125 minutes).

Now, if these two instances are treated as two unconnected components of single workflow graph. Then, total cost and make span is obtained as ($137.45, 51.125 minutes). This cost is lower than the combined cost of scheduling both the workflow instances by the system 100 separately. This cost benefits while scheduling workflow instances simultaneously and cannot be achieved. As workflow schedule traverses the workflow graph is traversed with (topological sort) and simultaneously allocates VMs to tasks. Thus, reuse of VMs between two tasks is required to be connected by an edge. Such method first sorts of tasks based on their start time and then allocates VMs to tasks. Thus, it does not require tasks to be connected by an edge for VM reuse between them. In real world scenarios, requirement to schedule multiple workflows simultaneously selects a combination of high and low processing capacity VMs when scheduling needs to be completed within a given timeline. Hence, cost benefits is significant.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of workflow scheduling. The embodiment, thus provides method and system for secure scheduling of workflows and virtual machine optimization in cloud. Moreover, the embodiments herein further provides robust solution selects virtual machine with lower costs minimizing execution time. Selection of security services such as authentication, integration and confidential accurate estimation of risks. Benefits of virtual machine reuse across adjacent and non-adjacent tasks due to ordering of tasks with the same start time. Security model keeps the risk rate of workflow below permissible limits for accurately estimating the risks. The present method explores all possible VM reuse options which results in cost reduction. VM reutilization is across adjacent and non-adjacent task. Adjacent task is the one which is connected by an edge in workflow, while non-adjacent task is the one which is not connected by an edge.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for secure scheduling of workflows and virtual machine utilization in cloud, comprising:

receiving, from a user via one or more hardware processors, a set of workflows comprising of one or more heterogeneous tasks;

extracting, from each heterogeneous task via the one or more hardware processors, a set of parameters comprising of a workload, a transfer bandwidth, an output data size, a task type, a virtual machine (VM) renting cost, and a security level requirement;

selecting, from the set of parameters of each heterogeneous task via the one or more hardware processors, a set of optimal VM type combination parameters and a set of security level combination parameters and ordering of set of tasks with same start timing using a combinatorial optimization technique;

generating, for the one or more heterogeneous tasks via the one or more hardware processors, a schedule for each VM type combination parameters that keeps a risk rate of the workflow below a permissible limit while estimating risk to provide optimal combination of the set of security level combination parameters for each task without violation of a risk rate constraint by, computing, using a start time based sorting technique, a set of timing parameters from at least one of (i) the set of optimal VM type and security level combination parameters, and the set of parameters, and (ii) sorting each heterogeneous task based on a start order of initial start time and capturing information of currently utilized VM for cost optimization, and allocating, using a task VM allocation technique, each heterogeneous task with the set of optimal VM type combination and security level combination by computing a time execution cost (TEC) and a total execution time (TET) based on the set of timing parameters, wherein a task risk probability of each heterogeneous task is computed using an exponential function of average arrival rate of current security threat per time slot ($\lambda$), a difference between a required security level $$\left(sr_i^j\right)$$

and a provided security level $$\left(sl_i^j\right)$$

for the heterogeneous task, and time slot per hour, and the processing time of heterogeneous task on the VM type, given by:

$$P\left(t_i, sl_i^j\right) = 1 - \exp\left(-\lambda^i\left(sr_i^j - sl_i^j\right)N(t_i)\right)$$

wherein $N(t_i)$ is number of time slots, wherein each slot is an hour for which $t_i$ is executed on the VMs, wherein a risk probability of all the security level requirements is computed using the task risk probability value given by:

$$P(t_i) = 1 - \prod_{l \in \{a,g,c\}} \left(1 - P(t_i, sl_i^l)\right),$$

and wherein the total risk rate of all the security level requirements are computed using the risk probability by linearizing risk rate constraints when the total risk rate of all the security level requirements are less than or equal to optimization constraints given by:

$$P(T) = 1 - \prod_{t_i \in T}(1 - P(t_i))$$

wherein the value of $P(T)$ must be lower than the risk rate threshold $P_c (P_c \in [0, 1])$, which is the permissible risk rate of the workflow given by:

$$\sum_{t_i \in T} \sum_{l \in \{a,g,c\}} -\lambda^l \left(sr_i^l - sl_i^l\right) N(t_i) \geq \log(1 - P_c),$$

number of hours for each task to use the VM is less than or equal to one $N (t_i)$, wherein $N (t_i)$ acts as a correction factor to prevent under estimation of risk and where 'a' represents authentication service, 'g' represents integrity service, and 'c' represents confidentiality service; and executing, via one or more hardware processors, each heterogenous task of the workflow according to the generated schedule.

2. The processor implemented method as claimed in claim 1, wherein the set of timing parameters comprises of a start time (ST), an end time (ET), an index array (ID) listing an index of one or more heterogeneous task, a start time array (ST[•]), and an end time array (ET[•]).

3. The processor implemented method as claimed in claim 2, wherein the start time based sorting technique comprises:

obtaining the set of VM type combination and the set of parameters and initialize the index array for storing the start order of each heterogenous task;

computing for each heterogeneous task (i) a total transfer time (TT), (ii) an execution time (EXT), and (iii) a security overhead (SC);

updating the start time array (ST[•]) of each heterogeneous task with maximum end time array (ET[j]) of its predecessor task and store in the start time array (ST[•]);

computing the end time array (ET[•]) which is the sum of start time array (ST[•]) and a total processing time (PT), wherein the total processing time is the sum of the security overhead (SC), execution time (EXT), and the total transfer time (TT);

updating a start time reserve array (STT) with the start time array (ST[•]) value and an end time reserve array (ET_r) with the end time array ET[•]); and sorting the start time (ST), the end time (ET), and the index array (ID) based on sorted order of start time.

4. The processor implemented method as claimed in claim 1, wherein the task VM allocation technique comprises:

initializing zeros for the total execution time and an idle time array (IT) for storing information;

searching for unutilized optimal VM type processed for prior heterogeneous task and is currently available to process next heterogeneous task with low VM renting cost and idle time, (i) if the heterogeneous task reuses the VM type used by corresponding predecessor task VM renting cost reduction is available with idle time and data transfer cost is excluded, and (ii) if the heterogeneous task reuses the VM type used by corresponding non-predecessor task VM renting cost reduction is for only available idle time;

renting a new VM type for each heterogeneous task when reusable VM type is unidentified;

computing a new idle time for the current heterogeneous task which reuses the VM type used by the prior heterogeneous task, and update idle time array (IT[j]) for the current heterogeneous task with an identifier and the new idle time array with current heterogeneous task (IT[i]);

computing for each heterogeneous task, the total execution cost, the total execution time, a task risk probability, a risk probability, and a total risk rate;

incrementing the total execution cost for the workflow for processing the current heterogeneous task by updating the data transfers;

sorting the end time, the index array and the start time and compute the total execution cost for the one or more heterogeneous task based on maximum end time; and computing the end time based on summing the start time with the difference value of the end time array and the start time array.

5. The processor implemented method as claimed in claim 4, wherein the total execution cost is computed based on the difference value between the start time and the end time.

6. The processor implemented method as claimed in claim 4, wherein the total execution time is computed based on the maximum end time duration of each heterogeneous task.

7. A system for secure scheduling of workflows and virtual machine utilization in cloud comprising:

a memory storing instructions;

one or more communication interfaces; and one or more hardware processors coupled to the memory via the one or more communication interfaces, wherein the one or more hardware processors are configured by the instructions to:

receive a set of workflows comprising of one or more heterogeneous tasks;

extract from each heterogeneous task, a set of parameters comprising of a workload, a transfer bandwidth, an output data size, a task type, a virtual machine (VM) renting cost, and a security level requirement;

select from the set of parameters of each heterogeneous task, a set of optimal VM type combination parameters and a set of security level combination parameters using a combinatorial optimization technique;

generate for the one or more heterogeneous tasks, a schedule for each VM type combination parameters that keeps a risk rate of the workflow below a permissible limit while estimating risk to provide optimal combination of the set of security level combination parameters for each task without violation of a risk rate constraint by, computing using a start time based sorting technique, a set of timing parameters from at least one of (i) the set of optimal VM type combination parameters, and the set of parameters, and (ii) sorting each heterogeneous task based on a start order of initial start time and capturing information of currently utilized VM for cost optimization, and allocating using a task VM allocation technique, each heterogeneous task with the set of optimal VM type combination by computing a time execution cost (TEC) and a total execution time (TET) based on the set of timing parameters, wherein a task risk probability of each heterogeneous task is computed using an exponential function of average arrival rate of current security threat per time slot ($\lambda$), a difference between a required security level $$\left(sr_i^l\right)$$

and a provided security level $$\left(sr_i^l\right)$$

the heterogeneous task, and time slot per hour, and the processing time of heterogeneous task on the VM type, given by:

$$P\left(t_i,\,sl_i^l\right) = 1 - \exp\left(\lambda^l\left(sr_i^l - sl_i^l\right)N(t_i)\right)$$

wherein $N(t_i)$ is number of time slots, wherein each slot is an hour for which $t_i$ is executed on the VMs, wherein a risk probability of all the security level requirements is computed using the task risk probability value given by:

$$P(t_i) = 1 - \sum\nolimits_{l\in\{a,g,c\}} \left(1 - P\left(t_i,\,sl_i^l\right)\right),$$

wherein the total risk rate of all the security level requirements are computed using the risk probability by linearizing risk rate constraints when the total risk rate of all the security level requirements are less than or equal to optimization constraints given by:

$$P(T) = 1 - \prod\nolimits_{t_i\in T} \left(1 - P(t_i)\right)$$

wherein the value of P(T) must be lower than the risk rate threshold $P_c$ ($P_c\in[0,\,1]$), which is the permissible risk rate of the workflow given by:

$$\sum\nolimits_{t_i\in T}\sum\nolimits_{l\in\{a,g,c\}} -\lambda^l\left(sr_i^l - sl_i^l\right)N(t_i)\right) \ge \log(1 - P_c),$$

wherein number of hours for each task to use the VM is less than or equal to one N $(t_i)$, wherein N $(t_i)$ acts as a correction factor to prevent under estimation of risk and where 'a' represents authentication service, 'g' represents integrity service, and 'c' represents confidentiality service; and execute each heterogenous task of the workflow according to the generated schedule.

8. The system of claim 7, wherein the set of timing parameters comprises of a start time (ST), an end time (ET), an index array (ID) listing an index of one or more heterogeneous task, a start time array (ST[•]), and an end time array (ET[•]).

9. The system of claim 8, wherein the start time based sorting technique comprises:

obtain the set of VM type combination and the set of parameters and initialize the index array for storing the start order of each heterogenous task;

compute for each heterogeneous task, (i) a total transfer time (TT), (ii) an execution time (EXT), and (iii) a security overhead (SC);

update the start time array (ST[•]) of each heterogeneous task with maximum end time array (ET[j]) of its predecessor task and store in the start time array (ST[•]);

compute the end time array (ET[•]) which is the sum of start time array (ST[•]) and a total processing time (PT), wherein the total processing time is the sum of the security overhead (SC), execution time (EXT), and the total transfer time (TT);

update a start time reserve array (ST$_r$) with the start time array (ST[•]) value and an end time reserve array (ET$_r$) with the end time array ET[•]); and sort the start time (ST), the end time (ET), and the index array (ID) based on sorted order of start time.

10. The system of claim 7, wherein the task VM allocation technique comprises:

initialize zeros for the total execution time and an idle time array (IT) for storing information;

search for unutilized optimal VM type processed for prior heterogeneous task and is currently available to process next heterogeneous task with low VM renting cost and idle time, (i) if the heterogeneous task reuses the VM type used by corresponding predecessor task VM renting cost reduction is available with idle time and data transfer cost is excluded, and (ii) if the heterogeneous task reuses the VM type used by corresponding non-predecessor task VM renting cost reduction is for only available idle time;

rent a new VM type for each heterogeneous task when reusable VM type is unidentified;

compute a new idle time for the current heterogeneous task which reuses the VM type used by the prior heterogeneous task, and update idle time array (IT[j]) for the current heterogeneous task with an identifier and the new idle time array with current heterogeneous task (IT[i]);

compute for each heterogeneous task, the total execution cost, the total execution time, a task risk probability, a risk probability, and a total risk rate;

increment the total execution cost for the workflow for processing the current heterogeneous task by updating the data transfers;

sort the end time, the index array and the start time and compute the total execution cost for the one or more heterogeneous task based on maximum end time; and compute the end time based on summing the start time with the difference value of the end time array and the start time array.

11. The system of claim 10, wherein the total execution cost is computed based on the difference value between the start time and the end time.

12. The system of claim 10, wherein the total execution time is computed based on the maximum end time duration of each heterogeneous task.

13. One or more non-transitory machine-readable information storage mediums comprising one or more instructions which when executed by one or more hardware processors cause:

receiving from a user a set of workflows comprising of one or more heterogeneous tasks;

extracting from each heterogeneous task, a set of parameters comprising of a workload, a transfer bandwidth, an output data size, a task type, a virtual machine (VM) renting cost, and a security level requirement;

selecting from the set of parameters of each heterogeneous task, a set of optimal VM type combination parameters and a set of security level combination parameters and ordering of set of tasks with same start timing using a combinatorial optimization technique;

generating for the one or more heterogeneous tasks, a schedule for each VM type combination parameters that keeps a risk rate of the workflow below a permissible limit while estimating risk to provide optimal combination of the set of security level combination parameters for each task without violation of a risk rate constraint by, computing using a start time based sorting technique, a set of timing parameters from at least one of (i) the set of optimal VM type and security level combination parameters, and the set of parameters, and (ii) sorting each heterogeneous task based on a start order of initial start time and capturing information of currently utilized VM for cost optimization, and allocating using a task VM allocation technique, each heterogeneous task with the set of optimal VM type combination and security level combination by computing a time execution cost (TEC) and a total execution time (TET) based on the set of timing parameters, wherein a task risk probability of each heterogeneous task is computed using an exponential function of average arrival rate of current security threat per time slot ($\lambda$), a difference between a required security level $$\left(sr_i^l\right)$$

and a provided security level $$\left(sl_i^l\right)$$

for the heterogeneous task, and time slot per hour, and the processing time of heterogeneous task on the VM type, given by:

$$P\left(t_i, sl_i^l\right) = 1 - \exp\left(\lambda^l\left(sr_i^l - sl_i^l\right)N(t_i)\right)$$

wherein $N(t_i)$ is number of time slots, wherein each slot is an hour for which $t_i$ is executed on the VMs, wherein a risk probability of all the security level requirements is computed using the task risk probability value given by:

$$P(t_i) = 1 - \prod_{l \in \{a,g,c\}} \left(1 - P\left(t_i, sl_i^l\right)\right),$$

and wherein the total risk rate of all the security level requirements are computed using the risk probability by linearizing risk rate constraints when the total risk rate of all the security level requirements are less than or equal to optimization constraints given by:

$$P(T) = 1 - \prod_{t_i \in T} (1 - P(t_i))$$

wherein the value of $P(T)$ must be lower than the risk rate threshold $P_c(P_c \in [0, 1])$, which is the permissible risk rate of the workflow given by:

$$\sum_{t_i \in T} \sum_{l \in \{a,g,c\}} -\lambda^l\left(sr_i^l - sl_i^l\right)N(t_i)) \geq \log(1 - P_c),$$

wherein number of hours for each task to use the VM is less than or equal to one N ($t_i$), wherein $N(t_i)$ acts as a correction factor to prevent under estimation of risk and where 'a' represents authentication service, 'g' represents integrity service, and 'c' represents confidentiality service; and executing each heterogenous task of the workflow according to the generated schedule.

14. The one or more non-transitory machine-readable information storage mediums of claim 13, wherein the set of timing parameters comprises of a start time (ST), an end time (ET), an index array (ID) listing an index of one or more heterogeneous task, a start time array (ST[•]), and an end time array (ET[•]).

\* \* \* \* \*